(12) United States Patent
Miyaguchi et al.

(10) Patent No.: US 7,015,975 B2
(45) Date of Patent: Mar. 21, 2006

(54) IMAGE PROCESSING DEVICE WITH A PROCESSING UNIT THAT PROCESSES IMAGE DATA IN UNITS OF ONE SCAN LINE

(75) Inventors: Hiroshi Miyaguchi, Tokyo (JP); Takao Kojima, Tokyo (JP)

(73) Assignee: Texas Instruments Incorporated, Dallas, TX (US)

( * ) Notice: Subject to any disclaimer, the term of this patent is extended or adjusted under 35 U.S.C. 154(b) by 874 days.

(21) Appl. No.: 09/907,312

(22) Filed: Jul. 17, 2001

(65) Prior Publication Data
US 2003/0016389 A1    Jan. 23, 2003

(30) Foreign Application Priority Data
Jul. 17, 2000    (JP) .............................. 2000-216531

(51) Int. Cl.
*H04N 1/17* (2006.01)
*H04N 5/907* (2006.01)

(52) U.S. Cl. ...................... 348/571; 348/715; 348/714; 348/440; 348/443; 382/305; 382/298

(58) Field of Classification Search ................ 348/441, 348/440, 443, 571, 715, 714, 704, 720, 721, 348/567; 382/303, 304, 305, 307, 298, 299, 382/300; 358/1.16, 1.17; 708/303, 231, 708/510
See application file for complete search history.

(56) References Cited

U.S. PATENT DOCUMENTS 5,005,080 A * 4/1991 Kanda ...................... 348/579

(Continued)

*Primary Examiner*—John Miller
*Assistant Examiner*—Jean W. Désir
(74) *Attorney, Agent, or Firm*—William B. Kempler; W. James Brady, III; Frederick J. Telecky, Jr.

(57) ABSTRACT

The objective of the invention is to provide an image processing device that can operate at high speed even if input/output with respect to the outside is performed at low speed, and that can fully exploit processibility, by means of input line memory 23 and output line memory 24, which can store image data of one scan line, and are arranged in the input unit and output unit, respectively; the input image data are written in input line memory 23 at the speed of the input image data; the image data that have been written to the input line memory are read at a speed n times faster than the input image data and are sent to processing unit 25 or memory unit 26; processing unit 25 and memory unit 26 receive the image data of one scan line at a speed n times faster than the speed of the input image data, perform a prescribed processing, and then output the processing results at a speed n times faster than the speed of the input image data; the image data output from processing unit 25 or memory unit 26 are selected by selector 29 and written to output line memory 24 at a speed n times faster than the speed of the input image data; the output image data are read in units of one scan line from output line memory 24 at a prescribed speed.

19 Claims, 17 Drawing Sheets

U.S. PATENT DOCUMENTS

| | | | |
|---|---|---|---|
| 5,210,705 A | * | 5/1993 | Chauvel et al. .............. 702/197 |
| 5,694,560 A | * | 12/1997 | Uya et al. .................... 715/781 |
| 5,724,441 A | * | 3/1998 | Yoshida ....................... 382/166 |
| 5,956,425 A | * | 9/1999 | Yoshida ....................... 382/234 |
| 6,317,159 B1 | * | 11/2001 | Aoyama ...................... 348/458 |
| 6,353,460 B1 | * | 3/2002 | Sokawa et al. .............. 348/555 |
| 6,748,514 B1 | * | 6/2004 | Yoshioka ...................... 712/13 |
| 6,763,450 B1 | * | 7/2004 | Miyaguchi et al. ......... 712/215 |

* cited by examiner

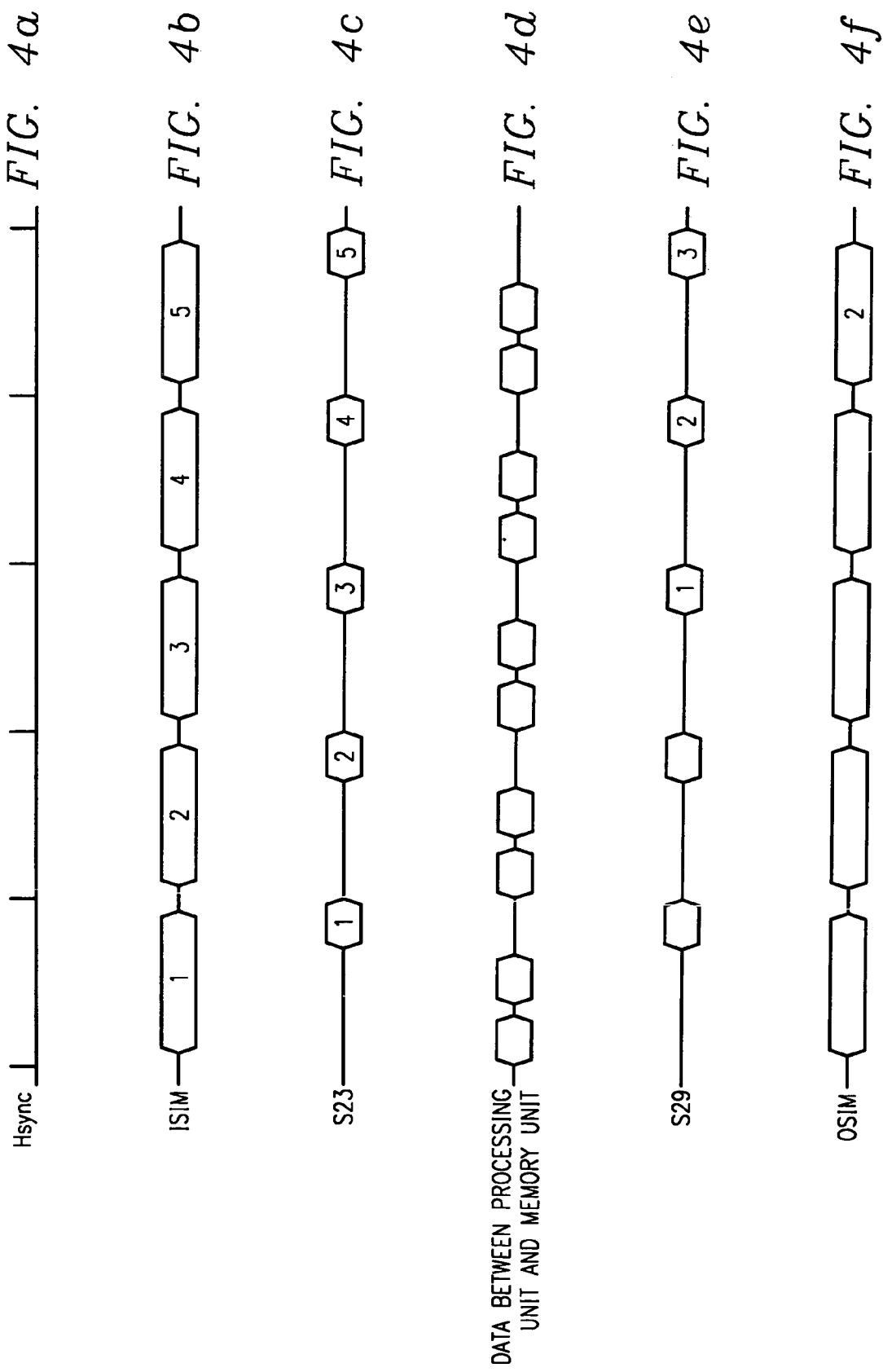

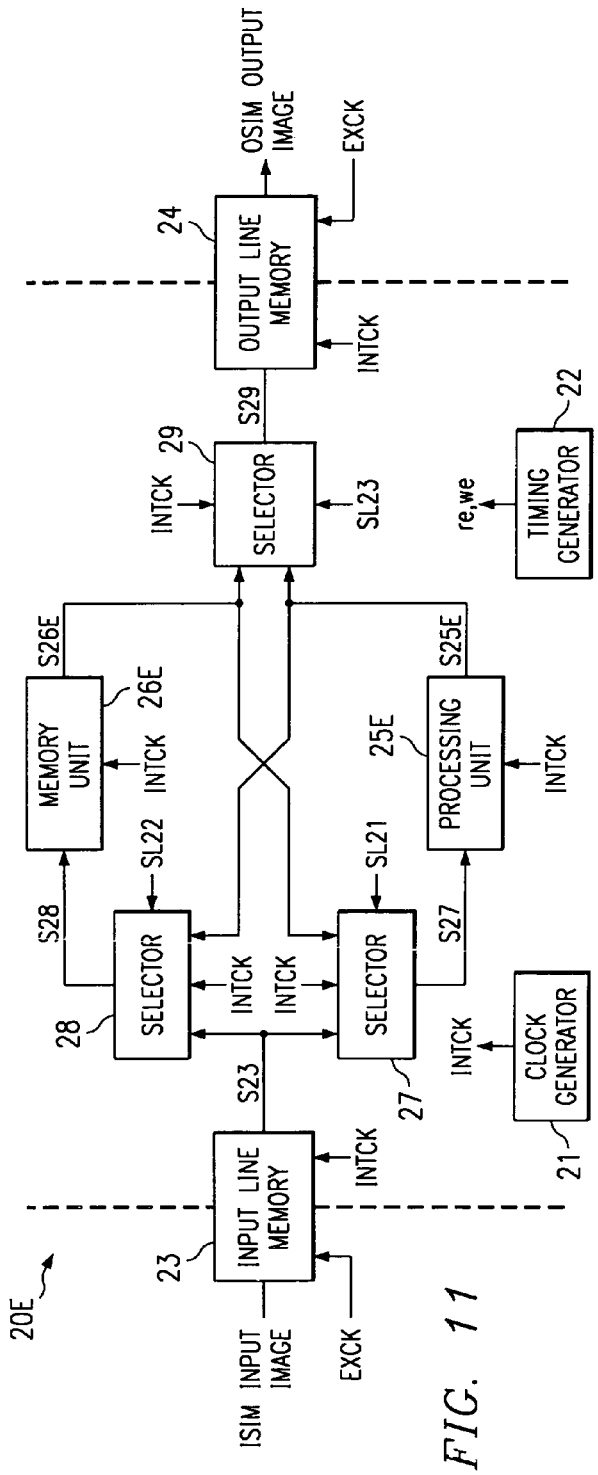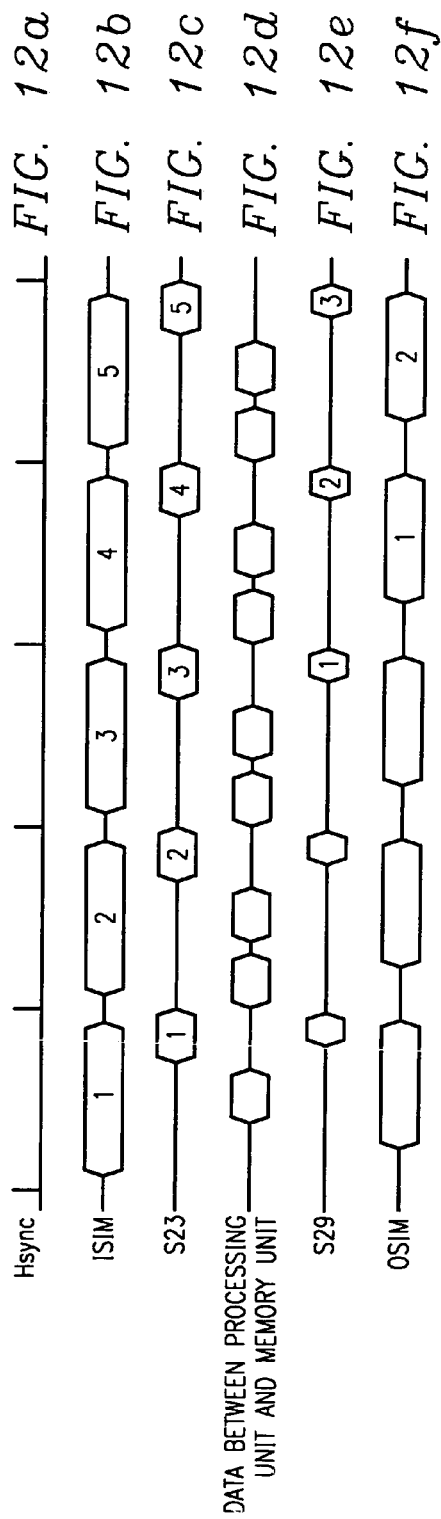

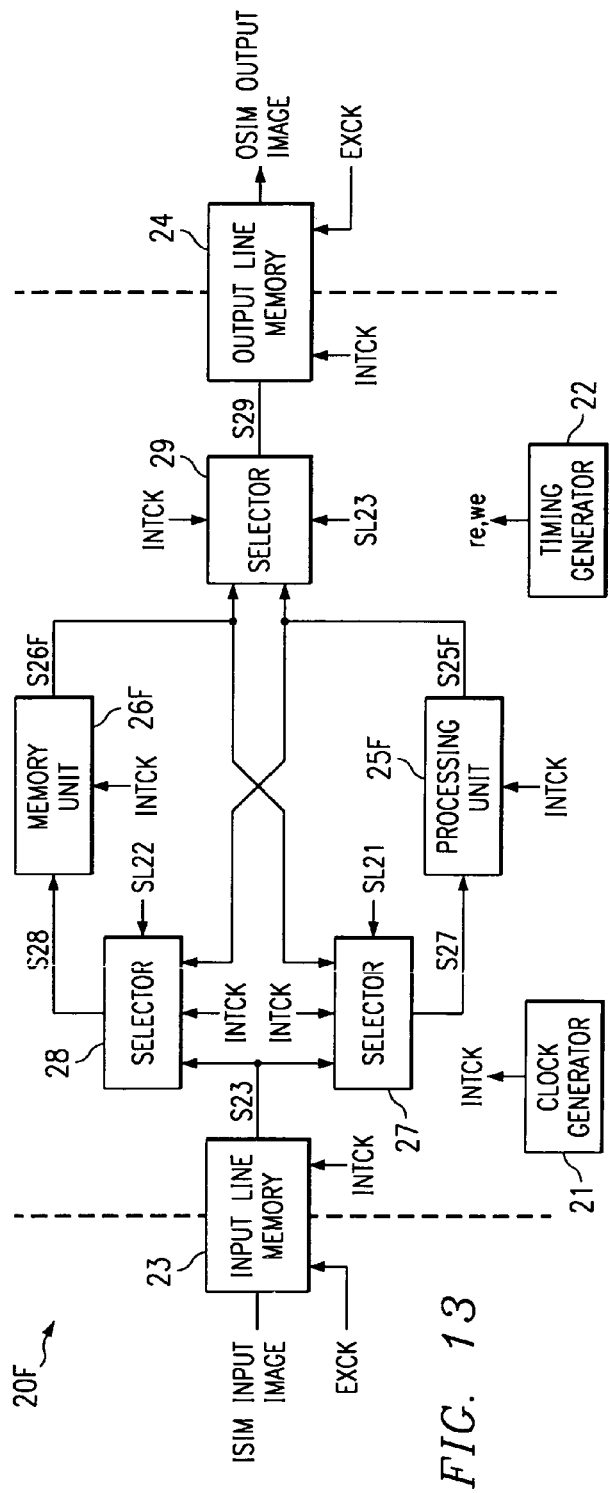
FIG. 13
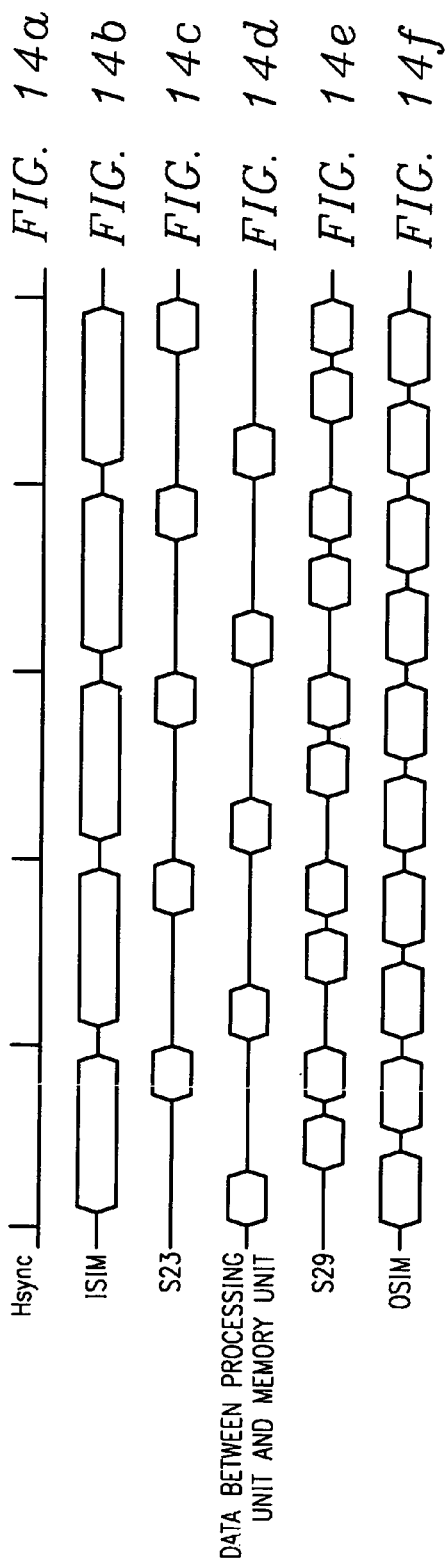
FIG. 14a
FIG. 14b
FIG. 14c
FIG. 14d
FIG. 14e
FIG. 14f

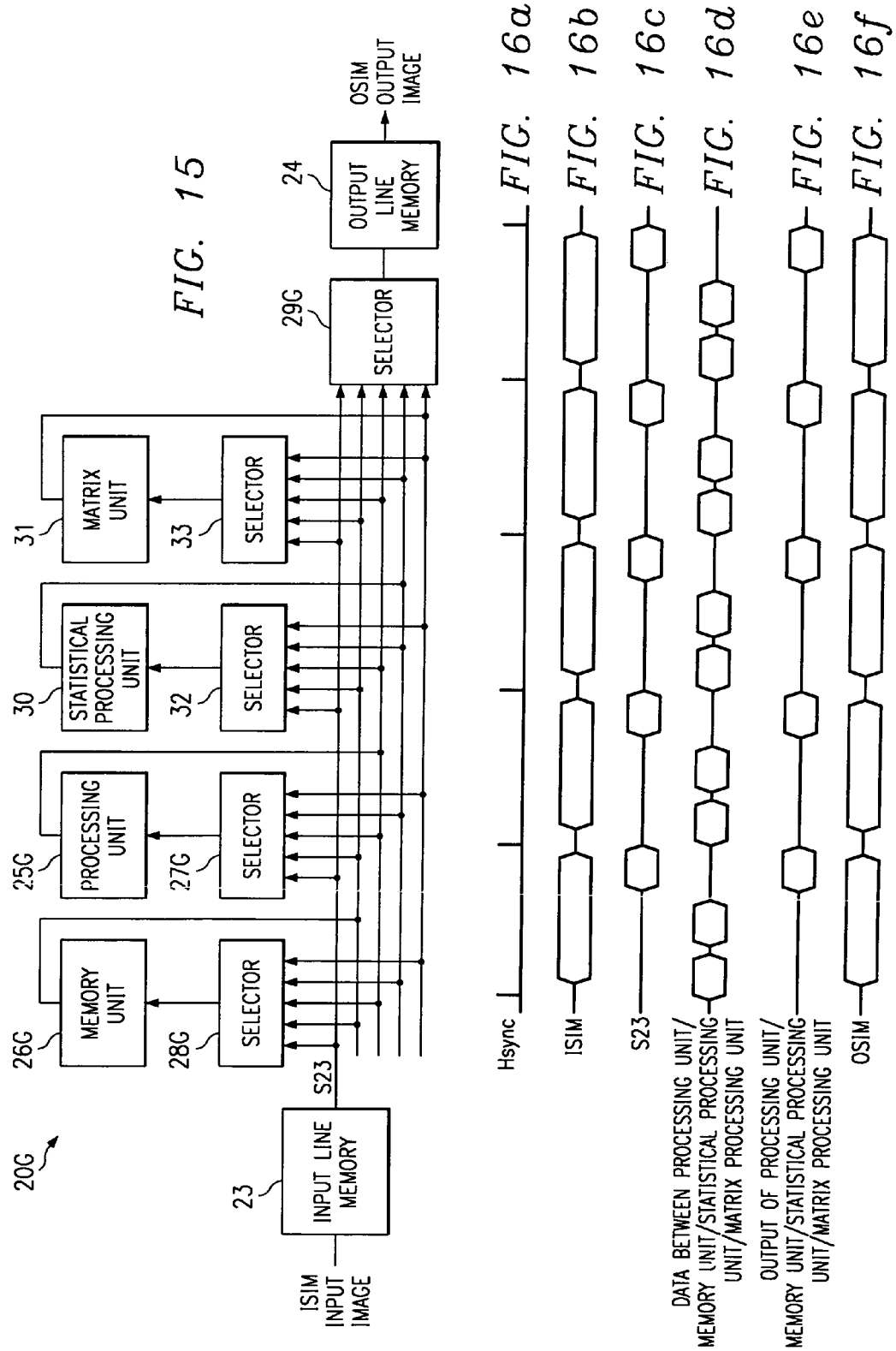

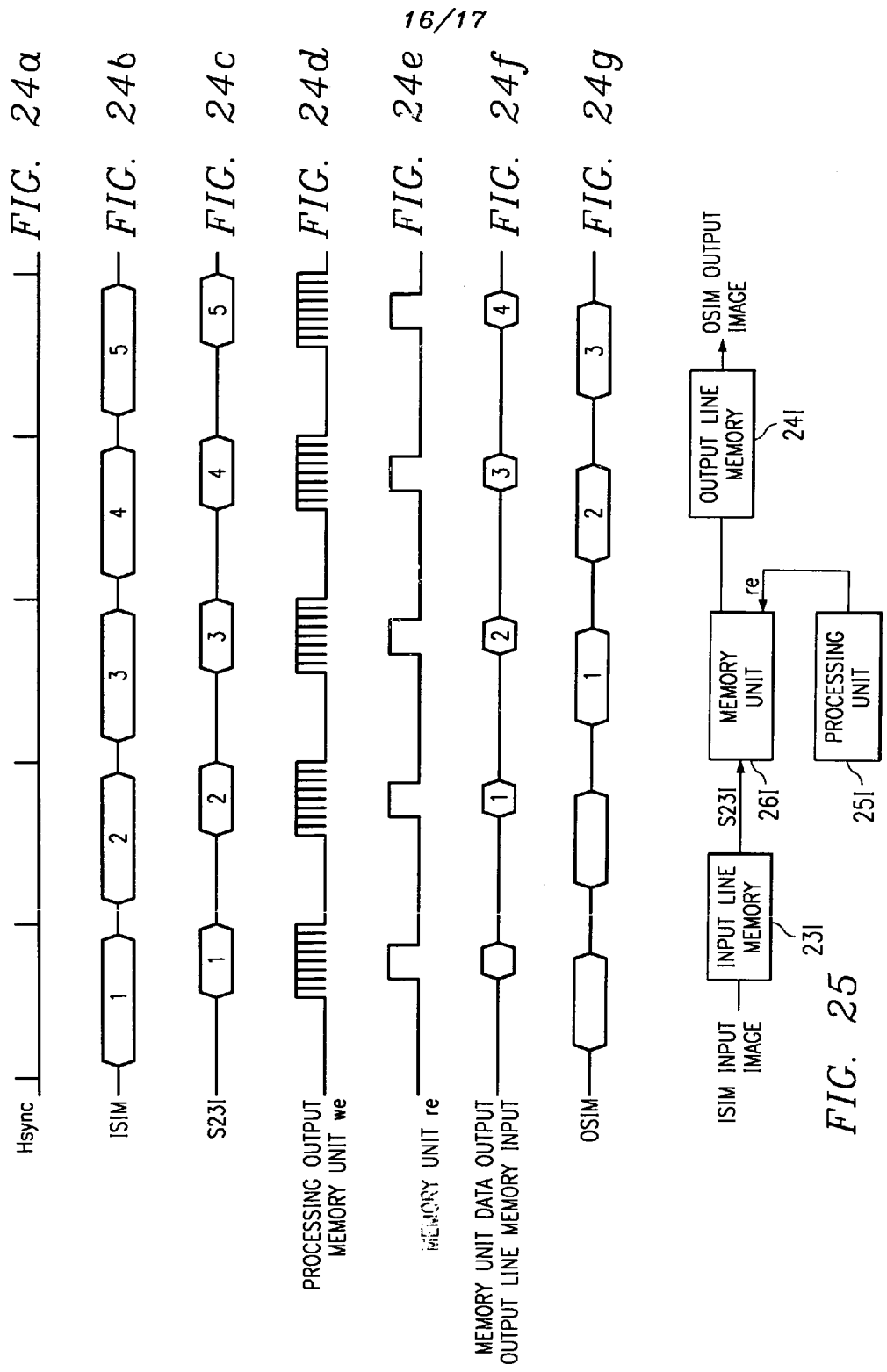

FIG. 26a Hsync

FIG. 26b ISIM

FIG. 26c S23I

FIG. 26d MEMORY UNIT we

FIG. 26e PROCESSING UNIT OUTPUT / MEMORY UNIT re

FIG. 26f MEMORY UNIT DATA OUTPUT / OUTPUT LINE MEMORY INPUT

FIG. 26g OSIM

IMAGE PROCESSING DEVICE WITH A PROCESSING UNIT THAT PROCESSES IMAGE DATA IN UNITS OF ONE SCAN LINE

FIELD OF THE INVENTION

The present invention pertains to an image processing device that has a processing unit, that acts as an image processor for processing image data in units of one scan line, and a memory unit that can read and write in units of one scan line.

BACKGROUND OF THE INVENTION

FIG. 1 is a block diagram illustrating the basic configuration of a conventional image processing device. FIG. 2 is the timing chart of the image processing device shown in FIG. 1.

As shown in FIG. 1, said image processing device 10 comprises processing unit 13, which processes data in units of one scan line, memory unit 14 which can read and write in units of one scan line, and selector 15 which outputs the output data of processing unit 13 or the data read from memory unit 14 in accordance with a selection signal SL1.

Said processing unit 13 comprises an SIMD (single-instruction multiple-data) type image DSP (digital signal processor) which has multiple processor elements (PE) arranged in parallel with each other and executes the same processing in parallel manner in said multiple PE corresponding to the given instructions.

In image processing device 10 with the aforementioned configuration, the input image data ISIM of one scan line are synchronized by a clock to the same frequency as an external block and are supplied to processing unit 13 or memory unit 14.

The intermediate processing data T13 or T14 output from processing unit 13 or memory unit 14, respectively, are fed back to memory unit 14 or processing unit 13.

The image data S13 that have been processed in processing unit 13 or the image data S14 output from memory unit 14 are synchronized by a clock to the same frequency as an external block and output via selector 15.

However, in the aforementioned conventional image processing device, since clocks are used to transfer data of processing unit 13 and memory unit 14, which process image data in units of one scan line, and to input/output the image data to the outside, the processors can only be used at a low speed even if they can operate at high speed. As a result, the processibility cannot be fully exploited. Also, since it is necessary for processing unit 13 and memory unit 14 to input/output the fed back intermediate processing data T13 and T14 in addition to input/output images S11, S13, and S14, the number of input/output terminals is increased. This is a disadvantage.

One purpose of the present invention is to solve the aforementioned problems by providing an image processing device that can operate at high speed inside, even if the input/output with respect to the outside is performed at low speed and that can improve processibility to the maximum extent. Another purpose of the present invention is to provide an image processing device that can reduce the number of input/output terminals of processing unit 13 and memory unit 14 to a minimum.

SUMMARY OF INVENTION

In order to realize the aforementioned purposes, the present invention provides an image processing device with a processing unit that processes image data in units of one scan line, and a memory unit that can read and write image data in units of one scan line; characterized by the fact that it comprises at least one input line memory that can store image data for one scan line and is able to write input image data at the transfer speed of the input image data and read the written image data at a faster speed than the transfer speed of the input image data; a transfer unit that inputs at least the image data read from the aforementioned input line memory to the aforementioned processing unit or memory unit; a selector that selects the image data output from the aforementioned processing unit or memory unit, and at least one output line memory that can store image data for one scan line and is able to write the image data selected by the aforementioned selector at a faster speed than the transfer speed of the image data and read the image data in units of one scan line at a prescribed speed; wherein the aforementioned processing unit and memory unit receive image data for one scan line at a faster speed than the transfer speed of the input image data, perform prescribed processing tasks, and then output the processing results at a faster speed than the transfer speed of the input image data.

Also, according to the present invention, the aforementioned transfer part has a first selector that selects either the image data read from the aforementioned input line memory or the image data output from the aforementioned memory unit corresponding to a first selection signal and inputs the selected image data to the aforementioned processing unit, and a second selector that selects either the image data read from the aforementioned input line memory or the image data read from the aforementioned processing unit corresponding to a second selection signal and inputs the selected image data to the aforementioned memory unit. The aforementioned first and second selection signals are supplied in such a way that the aforementioned processing unit and memory unit exchange the intermediate processing data during the time period when no input image data or output image data are transferred.

Also, according to the present invention, the image processing device has a timing generator that can generate a read enable signal of a block for outputting data and a write enable signal of a block for inputting said data as a single signal. The aforementioned input line memory and/or the aforementioned memory unit functions as the block that receives the aforementioned read enable signal and outputs data, while the aforementioned memory unit or processing unit functions as the block that receives the aforementioned write enable signal and inputs data. The image processing device has a write enable delay circuit that can delay the write enable signal appropriately so that the aforementioned memory unit or processing unit acting as the data-inputting block can correct the delay between the data-outputting block and the data-inputting block.

Also, according to the present invention, when the data from multiple data-outputting blocks are input to a single data inputting block, the image processing device has a read enable delay circuit for each of the data-outputting blocks in order to arrange the delay between each of the data-outputting blocks and the data-inputting blocks.

Also, according to the present invention, the transfer speed between the aforementioned input line memory and the aforementioned processing unit and memory unit, the transfer speed between the aforementioned output line memory and the aforementioned processing unit and memory unit, the processing speed of the aforementioned processing unit, and the storage speed of the aforementioned memory unit are all different.

Also, according to the present invention, the image processing device has multiple input line memories, and the input image data to each input line memory is asynchronous. The aforementioned memory unit has multiple input buffers corresponding to the input line memories. The aforementioned memory unit outputs other image data after synchronizing these image data input to the corresponding input buffers from other input line memories with the scan line of the image data to one of the input line memories.

Also, according to the present invention, the image processing device has multiple output line memories, and the output image data from each output line memory is asynchronous. The aforementioned memory unit has multiple output buffers corresponding to the output line memories. The aforementioned memory unit outputs the image data synchronized with the scan line of the input image data from one of the output buffers to the corresponding output line memory and outputs the image data asynchronous with the scan lines of the input image data from other output line memories to the corresponding output line memories.

Also, according to the present invention, the scan lines input from the aforementioned input line memories to the aforementioned memory unit, the scan line of the intermediate processing data exchanged between the aforementioned processing unit and memory unit, and the scan lines of the data output from the aforementioned processing unit or memory unit to the aforementioned output line memories are not synchronized with each other.

Also, according to the present invention, the aforementioned processing unit reduces the number of pixels of the input image data.

Also, according to the present invention, the aforementioned processing unit performs interpolation processing on the pixels of the input image data.

Also, according to the present invention, the image processing device has at least one processing unit that processes image data in units of one scan line in addition to the aforementioned processing unit and memory unit, and that the input data from the aforementioned input line memory, the intermediate processing data exchanged between the aforementioned processing unit and memory unit, or the output data output to the aforementioned output line memory are processed for the required number of times.

Also, according to the present invention, the aforementioned processing unit has multiple sets of coefficients, and the set of coefficients used is varied when the processing unit is used multiple times.

Also, according to the present invention, the aforementioned processing unit includes a matrix processing unit, and the aforementioned matrix processing unit performs "3×3" matrix calculations and three third-order polynomial calculations depending on a switch setting.

Also, according to the present invention, the image processing device has an input means with the following functions: when image data pertaining to a scan line that has a number of pixels that exceeds the capacity of the aforementioned input line memory are input, the scan line of the number of pixels that exceeds the capacity of the aforementioned input line memory is divided into multiple data blocks with the number of pixels below a prescribed level; the image data pertaining to the scan line are continuously written to the aforementioned input line memory; after a certain period of time has passed since the beginning of the write operation, part of the scan line is read out; after the read operation is stopped for a prescribed period of time, the rest of the scan line is read out; and the above operation is repeated.

Also, according to the present invention, the image processing device has an output means with the following function: after the data divided into the aforementioned multiple blocks are processed, the processing results are written to the aforementioned output line memory; after a certain period of time since the beginning of the write operation has passed, the aforementioned multiple blocks are continuously read; in this way, the original one scan line can be output.

Also, according to the present invention, the aforementioned input means returns the read address during the aforementioned read stopping period to repeat the final part of the data block that has been read with the beginning part of the data block to be read next.

Also, according to the present invention, when the aforementioned output means writes the aforementioned processing results to the aforementioned output line memory after the data divided into multiple blocks have been processed, the aforementioned repeated part is not written, and the aforementioned multiple blocks are continuously read after a certain period of time since the beginning of the write operation has passed so that the original one scan line can be output without repetition.

Also, according to the present invention, the aforementioned processing unit shrinks images by outputting a write enable signal, that sets write execution/stop in any period for each pixel or scan line, and by controlling the write operation of the aforementioned processing unit, memory unit, or output line memory as a function of the write enable signal.

Also, according to the present invention, the aforementioned processing unit enlarges images by outputting a read enable signal that sets read execution/stop in any period for each pixel or scan line, and by controlling the reading operation of the aforementioned input line memory or memory unit as a function of the read enable signal.

According to the present invention, line memories (input line memory and output line memory) that can store image data of one scan lines are arranged in the input unit and output unit.

The input image data are written into the input line memory at the transfer speed of the input image data. The image data that have been written into the input line memory are read out and transferred to the processing unit or memory unit at a faster speed than the transfer speed of the input image data.

The processing unit and memory unit receive the image data of one scan line at a faster speed than the transfer speed of the input image data, perform prescribed processing tasks, and then output the processing results at a high speed.

The image data output from the processing unit or memory unit are selected by the selector and written to the output line memory at a faster speed than the speed of the input image data. The output image data are read in units of one scan line from the output line memory at a prescribed speed.

BRIEF DESCRIPTION OF THE DRAWINGS

FIG. 4 is a timing diagram of the image processing device shown in FIG. 3.

FIG. 11 is a block diagram illustrating the sixth embodiment of the image processing device disclosed in the present invention.

FIG. 12 is the timing diagram of the image processing device shown in FIG. 11.

FIG. 13 is a block diagram illustrating the seventh embodiment of the image processing device disclosed in the present invention.

FIG. 14 is the timing diagram of the image processing device shown in FIG. 13.

FIG. 15 is a block diagram illustrating the eighth embodiment of the image processing device disclosed in the present invention.

FIG. 16 is the timing diagram of the image processing device shown in FIG. 15.

FIG. 24 is a diagram explaining a case of supplying write enable signal we set at the desired timing to the processing unit and memory unit in the eleventh embodiment.

FIG. 25 is a diagram explaining a case of supplying read enable signal re set at the desired timing to the processing unit and memory unit in the eleventh embodiment.

FIG. 26 is a diagram explaining a case of supplying read enable signal re set at the desired timing to the processing unit and memory unit in the eleventh embodiment.

REFERENCE NUMBERALS AND SYMBOLS AS SHOWN IN THE DRAWINGS

In the FIGS, 20, 20–20I are image processing devices, 21 is a clock generator, 22 is a timing generator, 23, 23A–23I, 23-1, 23-2 are input line memories, 24, 24A–24I, 24-1, 24-2 are output line memories, 25, 25A–25I are processing units, 26, 26A–26I are memory units, 26, 27–29, 32, 33 are selectors, 30 is a statistical processing unit, 31 is a matrix processing unit, 231, 251, 261, 262 are variable delay circuits, 252 is a input buffer, 254 is a output buffer, 254 is a processing circuit, 263, 263-1, 263-2 are input buffers, 264, 264-1, 264-2 are output buffers, 265 is a memory circuit, 301–309 are multipliers, 310–318 are adders, and 319–395 are selectors

DESCRIPTION OF EMBODIMENTS

First Embodiment

Figure 3:
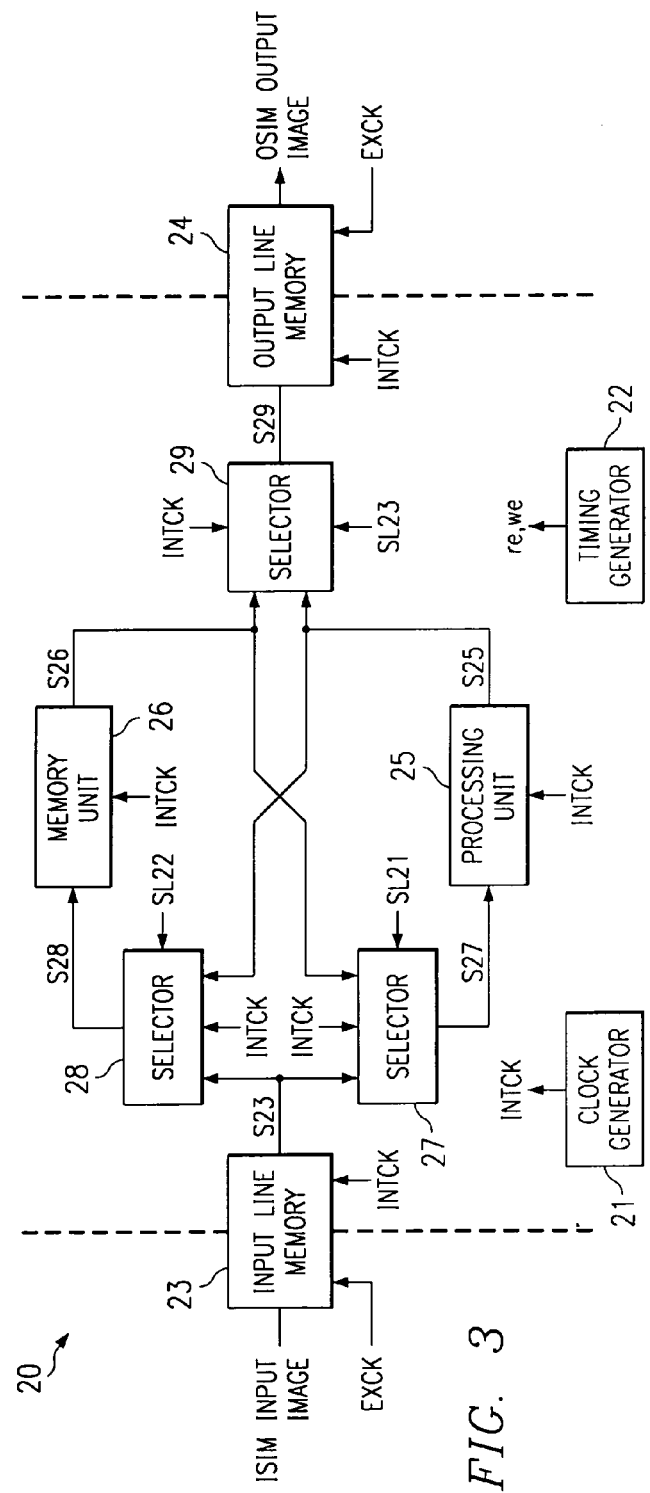
FIG. 3 is a block diagram illustrating the first embodiment of the image processing device disclosed in the present invention.

FIG. 3 is a block diagram illustrating the first embodiment of the image processing device disclosed in the present invention. FIG. 4 is the timing diagram of the image processing device shown in FIG. 3.

As shown in FIG. 3, the image processing device 20 disclosed in the first embodiment comprises clock generator 21, timing generator 22, input line memory 23, output line memory 24, processing unit 25, memory unit 26, as well as selectors 27, 28, and 29.

The transfer part comprises selector 27 (first selector) and selector 28 (second selector).

Clock generator 21 generates an internal clock signal INTCK of several hundred MHz which is n times faster than the external clock (for example, tens of MHz) and supplies this clock signal to the reading system of input line memory 23, the writing system of output line memory 24, the input/output system of processing unit 25, the writing and reading systems of memory unit 26, and various selectors 27–29.

Timing generator 22 generates a prescribed timing signal and supplies it as read enable signal re to the reading system of input line memory 23, the reading system of processing unit 25, and the reading system of memory unit 26 and supplies it as write enable signal we to the input system of processing unit 25, the writing system of memory unit 26, and the writing system of the output line memory.

Input line memory 23 can store image data of one scan line and synchronize and write the input image data ISIM of one scan line to the external clock signal EXCK at a lower speed (for example, tens of MHz) than the internal clock signal INTCK during the horizontal synchronous signal Hsync (one horizontal synchronization period).

Also, said input line memory 23 receives read enable signal re generated by timing generator 22, synchronizes it with the internal clock signal INTCK generated by clock generator 21 at a higher speed than the external clock signal EXCK, reads the image data of one scan line, and supplies it as signal S23 to selectors 27 and 28.

Output line memory 24 can store image data of one scan line and write the output image data of processing unit 25 or the image data of one scan line read from memory unit 26 as signal S29 via selector 29 synchronously with the internal clock signal INTCK generated by clock generator 21 and having a higher speed than the external clock signal EXCK.

Also, output line memory 24 reads the image data of one scan line as output image OSIM synchronously with the external clock signal EXCK which has a slower speed (for example, tens of MHz) than the internal clock signal INTCK.

Processing unit 25 comprises an SIMD type image DSP which has multiple PE arranged in parallel with each other and executes the same processing in parallel fashion in said multiple PE corresponding to the given instructions. It receives write enable signal we generated by timing generator 22 to the input system, synchronizes it with the high-speed internal clock signal INTCK generated by clock generator 21, receives the image data of one scan line read from input line memory 23 or memory unit 26 as signal S27 via selector 27, carries out a prescribed process, such as convolution, and outputs the processing results synchronously with the internal clock signal INTCK.

Memory unit 26 can write and read in units of one scan line. It receives write enable signal we generated by timing generator 22 to the writing system, synchronizes it with the high-speed internal clock signal INTCK generated by clock generator 21, and receives and writes the image data of one scan line read from input line memory 23 or output from processing unit 25 as signal S28 via selector 28. The memory unit also receives read enable signal re generated by timing generator 22 to the reading system, synchronizes it with the high-speed internal clock signal INTCK generated by clock generator 21, reads the image data of one scan line as signal S26 and outputs it to selectors 27 and 29.

Selector 27 selects the image data of one scan line read from input line memory 23 or memory unit 26 corresponding to a selection signal SL21 generated by a control system (not shown in the FIG.) and outputs the selected image data as signal S27 to processing unit 25.

Selector 28 selects the image data of one scan line read from input line memory 23 or output from processing unit 25 corresponding to a selection signal SL22 generated by a control system (not shown in the FIG.) and outputs the selected image data as signal S28 to memory unit 26.

Selector 29 selects the image data of one scan line output from processing unit 25 or read from memory unit 26 corresponding to a selection signal SL23 generated by a control system (not shown in the FIG.) and outputs the selected image data as signal S29 to output line memory 24.

In the present embodiment, selection signals SL21 and SL22 are supplied to selectors 27 and 28 such that processing unit 25 and memory unit 26 exchange the intermediate processing data between processing unit 25 and memory unit 26 during the time period when there is no transfer of input image data or output image data as shown in FIGS. 4(c) and 4(d), that is, data transfer is performed between processing unit 25 and memory unit 26 as shown in FIG. 4(d) during the period until the image data of input line memory 23 are written and then read as signal S23 as shown in FIG. 4(c).

In the present embodiment, the timing signal generated by one timing generator 22 is supplied as read enable signal re and write enable signal we to input line memory 23, memory unit 26, processing unit 25, and output line memory 24. However, in consideration of the delay during data transfer, variable delay circuits used for correcting the delay are arranged on the writing side or on both the writing and reading sides.

Figure 1:
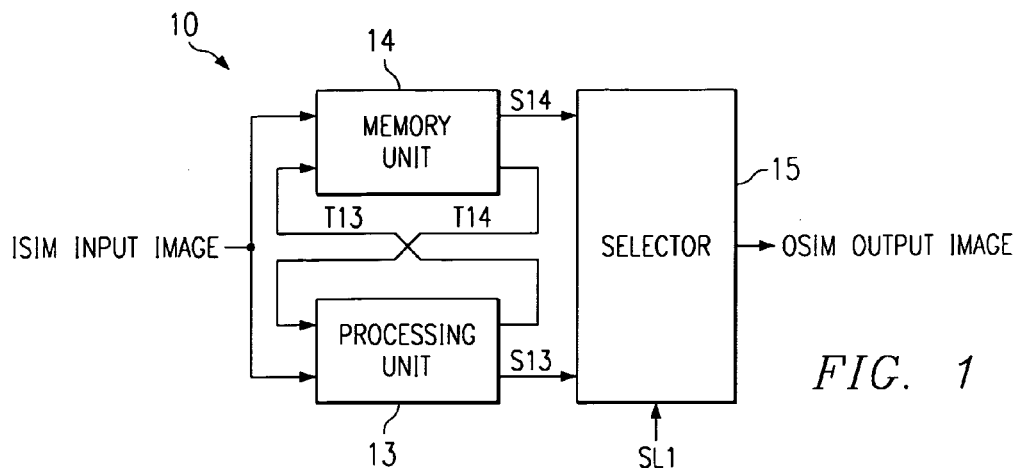
FIG. 1 is a block diagram illustrating the basic measurement of a conventional image processing device.
Figure 5:
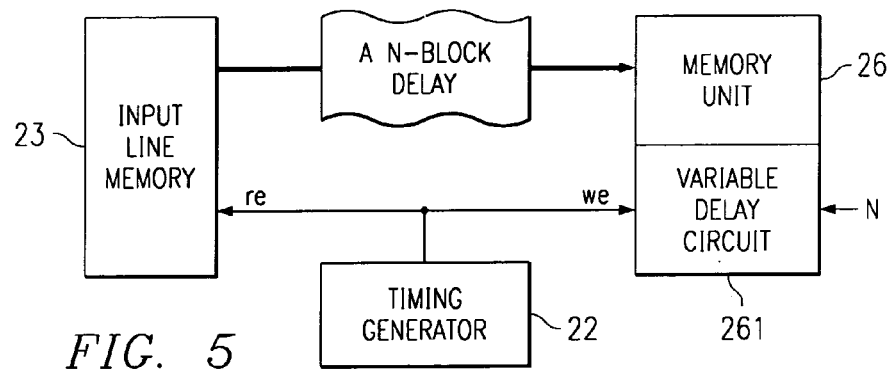
FIG. 5 is a diagram illustrating an example in which a write enable variable delay circuit is arranged in the memory unit on the receiving side in the case when the image data of one scan line read out the input line memory are transferred to the memory unit.
Figure 6:
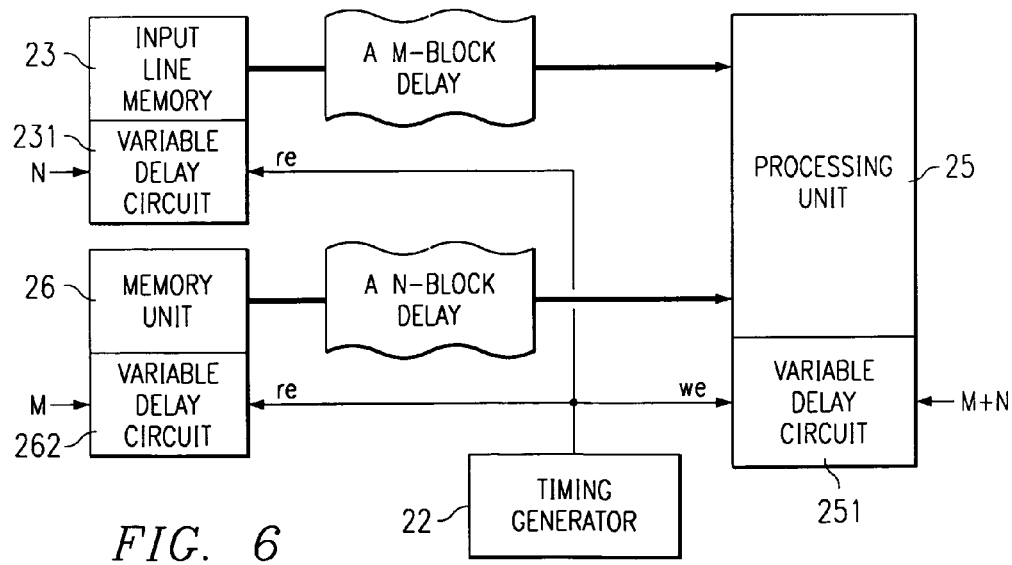
FIG. 6 is a diagram illustrating an example in which respective read enable variable delay circuits are arranged in the input line memory and memory unit on the transmitting side, and a write enable variable delay circuit is arranged in the processing unit on the receiving side when the image data for one scan line read from the input line memory and the image data read from the memory unit are transferred to the processing unit.
Figure 2:
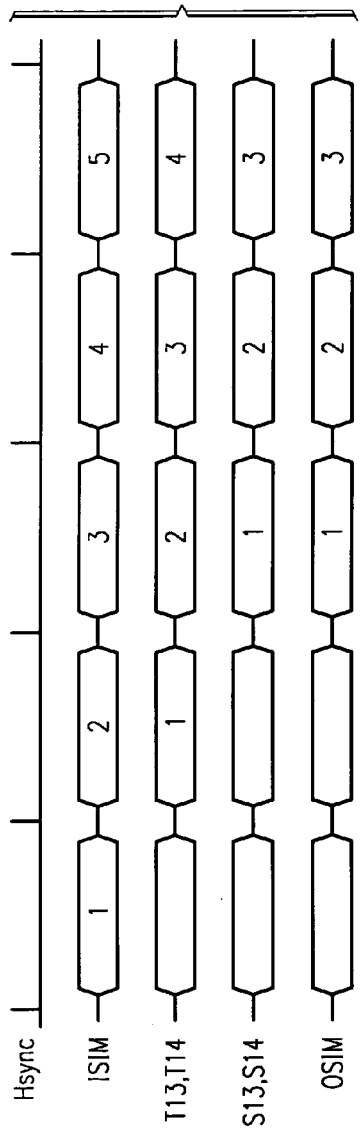
FIG. 2 is a timing diagram of the image processing device shown in FIG. 1.

An example is shown in FIGS. 5 and 6.

FIG. 5 is a diagram illustrating an example which has a variable delay circuit 261 in memory unit 26 on the receiving side when the image data of one scan line read from input line memory 23 are transferred to memory unit 26.

That is, in the example shown in FIG. 5, the read enable signal re of input line memory 23 acting as the data outputting block and the write enable signal we of memory unit 26 acting as the data inputting block are generated by a single timing generator 22. In order to correct the delay N between the data outputting block and the data inputting block, there is a write enable variable delay circuit 261 in memory unit 26 acting as the data inputting block.

In this case, when the image data of one scan line read from input line memory 23 are transferred to memory unit 26, there is an N-block delay. The write enable signal we supplied to variable delay circuit 261 is delayed by N blocks in accordance with instructions from a control system (not shown in the FIG.) before it is input to the writing system of memory unit 26.

FIG. 6 is a diagram illustrating an example which has variable delay circuits 231 and 262 in input line memory 23 and memory unit 26 on the transfer side when transferring the image data of one scan line read from input line memory 23 and the image data read from memory unit 26 to processing unit 25, and also has a variable delay circuit 251 arranged in processing unit 25 on the receiving side.

That is, in the example shown in FIG. 6, when data from multiple input line memories 23 acting as data outputting blocks and from memory unit 26 are input to processing unit 25 acting as a single data inputting block, in order to correct the delay between each of the data outputting blocks and the data inputting block, read enable variable delay circuits 231 and 261 are arranged in each input line memory 23 acting as a data outputting block and memory unit 26, and a write enable variable delay circuit 251 is arranged in processing unit 25 acting as the data inputting block.

In this case, when the image data of one scan line read from input line memory 23 are transferred to operating part 25, there is an M-block delay. When the image data of one scan line read from memory unit 26 are transferred to processing unit 25, there is an N-block delay. The read enable signal re supplied to variable delay circuit 231 is delayed by N blocks according to the instruction of a control system (not shown in the FIG.) before being supplied to the reading system of input line memory 23. The read enable signal re supplied to variable delay circuit 262 is delayed by M blocks before being input to the reading system of memory unit 26. The write enable signal we supplied to the variable delay circuit 251 in processing unit 25 is delayed by M+N blocks before being input to processing unit 25.

In the following, the operation of the aforementioned configuration will be explained.

First, in input line memory 23, input image ISIM of one scan line are written synchronously with external clock signal EXCK at a slower speed (such as tens of MHz) than the internal clock signal INTCK during the period of the horizontal synchronization period signal Hsync (one horizontal synchronization period).

After a prescribed period of time, for example, immediately before the input of the next horizontal synchronization signal Hsync, the read enable signal re generated by timing generator 22 is received, and the image data written to input line memory 23 are read synchronously with the internal clock signal INTCK generated by clock generator 21 and having a faster speed than the external clock signal EXCK and are supplied as signal S23 to selectors 27 and 28.

A selection signal SL21 is supplied by a control system (not shown in the FIG.) to selector 27. The image data of one scan line read either from input line memory 23 or memory unit 26 are selected by selector 27 corresponding to selection signal SL21 and are output as signal S27 to processing unit 25.

Similarly, a selection signal SL22 is supplied by a control system (not shown in the FIG.) to selector 28. Image data of one scan line read from input line memory 23 or output from processing unit 25 are selected by selector 28 corresponding to selection signal SL22 and are output as signal S28 to memory unit 26.

Selection signals SL21 and SL22 are supplied to selectors 27 and 28 in such a way that data transfer is performed between processing unit 25 and memory unit 26 during the period after the image data of input line memory 23 are written and before they are read as signal S23. In this way, the intermediate processing data are exchanged between processing unit 25 and memory unit 26 during the time period when processing unit 25 and memory unit 26 do not transfer input image data or output image data.

In processing unit 25, the write enable signal we generated by timing generator 22 and delayed for a prescribed period of time by variable delay circuit 251 is supplied to the input system and synchronized with the high-speed internal clock signal INTCK generated by clock generator 21 so that image data for one scan line read from input line memory 23 or memory unit 26 are supplied as signal S27 via selector 27. A prescribed process, such as convolution, is performed in processing unit 25. The processing results are output to selectors 28 and 29 synchronously with the internal clock signal INTCK.

In memory unit 26, the write enable signal we generated by timing generator 22 is input to the writing system after being delayed for a prescribed period of time by variable delay circuit 261 and synchronized with the high-speed internal clock signal INTCK generated by clock generator 21 so that the image data of one scan line read from input line memory 23 or output from processing unit 25 are received and written as signal S28 via selector 28.

Also, in memory unit 26, read enable signal re generated by timing generator 22 and delayed for a prescribed period of time by variable delay circuit 262 is received by the reading system and synchronized with the high-speed internal clock signal INTCK generated by clock generator 21 so that image data for one scan line are read out as signal S26 and output to selectors 27 and 29.

A selection signal SL23 is supplied by a control system (not shown in the FIG.) to selector 29. In selector 29, image data for one scan line output from processing unit 25 or read from memory unit 26 are selected corresponding to the selected signal SL23 and output as signal S29 to output line memory 24.

In output line memory 24, the output image data of processing unit 25 or the image data for one scan line read from memory unit 26 are written as signal S29 via selector 29 synchronously with the internal clock signal INTCK generated by clock generator 21 and having a faster speed than the external clock signal EXCK.

In output line memory 24, the image data for one scan line written synchronously with the internal clock signal INTCK are read out as output image OSIM synchronously with the external clock signal EXCK having a slower speed (such as tens of MHz) than the internal clock signal INTCK.

As explained above, according to the first embodiment of the present invention, in the image processing device which has processing unit 25 that processes image data in units of one scan line and memory unit 26 that can write and read image data in units of one scan line, input line memory 23 and output line memory 24 which can store image data of one scan line are arranged in the input and output units, respectively. The input image data are written to input line memory 23 at the transfer speed of the input image data. The image data that have been written into the input line memory are read out at a speed n times faster than the transfer speed of the input image data and are output to processing unit 25 or memory unit 26. Said processing unit 25 and memory unit 26 receive the image data of one scan line at a speed n times faster, carry out a prescribed process, and then output the processing results at a speed n times faster. The image data output from processing unit 25 or memory unit 26 are selected by selector 29 and are written into output line memory 24 at a speed n times faster. The output image data are read out in units of one scan line from output line memory 24 at a prescribed speed. Consequently, even if the input/output with respect to the outside is performed at low speed, the operation can be performed at high speed inside the device. Thus, the ability of the processor can be fully exploited.

Also, the intermediate processing data can be exchanged between processing unit 25 and memory unit 26 during the time period when processing unit 25 and memory unit 26 do not transfer the input image data or output image data.

In addition, by arranging data selectors 27 and 28 before processing unit 25 and memory unit 26, the number of input terminals of processing unit 25 and memory unit 26 can be reduced. Since the output image data output from processing unit 25 and memory unit 26 and the intermediate processing data are output from the same output terminals, the number of output terminals of processing unit 25 and memory unit 26 can also be reduced.

Moreover, the read enable signal re of input line memory 23 acting as the data outputting block and the write enable signal we of processing unit 25 and memory unit 26 acting as the data inputting blocks are generated by a single timing generator 22. In order to correct the delay between the data outputting block and the data inputting block, write enable delay circuits 251 and 261 are arranged in processing unit 25 and memory unit 26 acting as the data inputting blocks. Also, when the data from multiple input line memories 23 and memory unit 26 acting as the data outputting blocks are input to processing unit 25 or memory unit 26 acting as a single data inputting block, in order to correct the delay between each data outputting block and the data inputting block, read enable delay circuits 231 and 262 as well as write enable delay circuit 251 are arranged in the data outputting blocks. Consequently, data can be transferred efficiently and accurately in image processing device 20.

Second Embodiment

Figure 7:
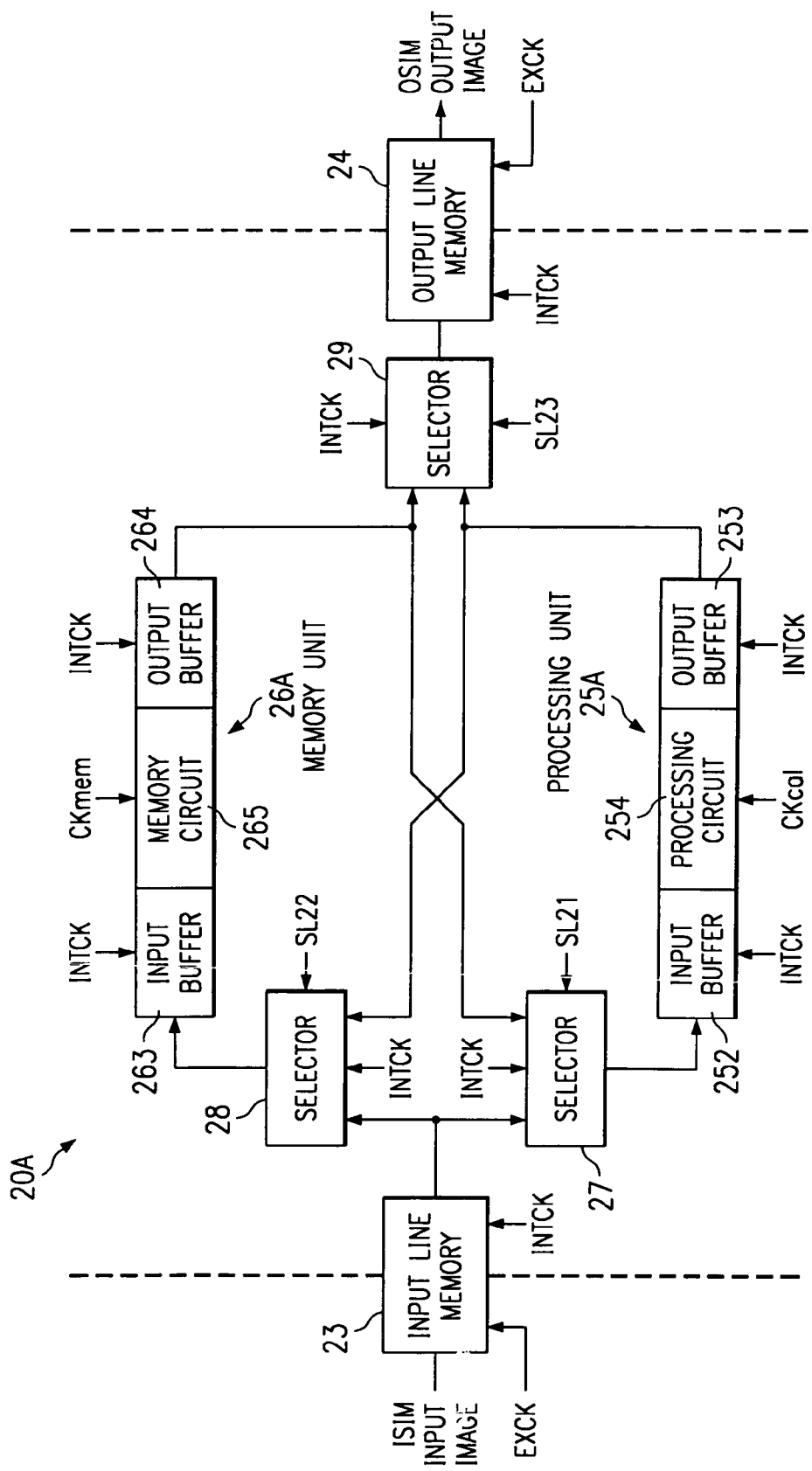
FIG. 7 is a block diagram illustrating the second embodiment of the image processing device disclosed in the present invention.

FIG. 7 is a block diagram illustrating the second embodiment of the image processing device disclosed in the present invention.

The difference between the second embodiment and said first embodiment is that the transfer speed between the input/output line memory and the memory unit, the operating speed of the processing unit, and the storage speed of the memory unit are different from each other.

More specifically, for the image processing device 20A disclosed in the second embodiment, processing unit 25A comprises input buffer 252, output buffer 253, and processing circuit 254. Memory unit 26A comprises input buffer 263, output buffer 264, and memory circuit 265. Said input buffers 252 and 263 as well as output buffers 253 and 264 input/output image data operate synchronously with internal clock signal INTCK generated by clock generator 21 (not shown in FIG. 7). Said processing circuit 254 and memory circuit 265 perform calculation and storage synchronously with internal clocks CKcal and CKmem with different frequency from the internal clock signal INTCK.

However, the frequencies of internal clocks CKcal and CKmem are set higher than the frequency of external clock signal EXCK.

Although the entire circuit is not shown in FIG. 7, the rest of the configuration and operation are the same as those of the first embodiment.

According to the second embodiment, the same effects as those of said first embodiment can be realized.

Third Embodiment

Figure 8:
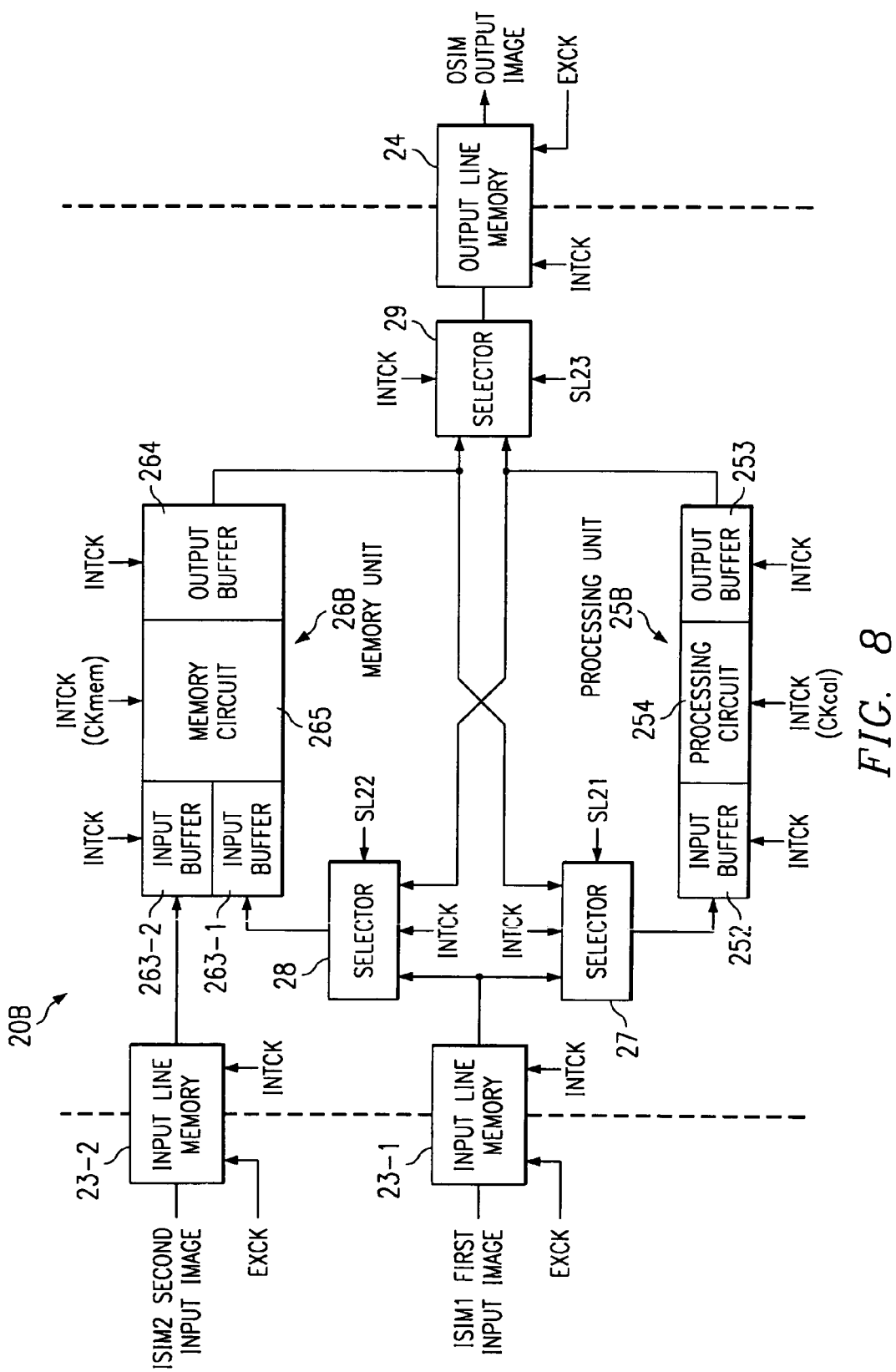
FIG. 8 is a block diagram illustrating the third embodiment of the image processing device disclosed in the present invention.

FIG. 8 is a block diagram illustrating the third embodiment of the image processing device disclosed in the present invention.

The difference between the third and second embodiments is as follows: the memory part has multiple input buffers (two in the third embodiment); as a result, a second input line memory is adopted; during the stage when the first input image ISIM1 input from the first input line memory 23-1 to the first input buffer 263-1 of memory unit 26B and the intermediate processing data between processing unit 25B and memory unit 26B, or the second input image ISIM2, which is asynchronous with the scan line of the data output from processing unit 25B or memory unit 26B to output line memory 24, are input to the second input buffer 263-2 of memory unit 26B from the second input line memory 23-2 and are output from output buffer 264, the second image is synchronized with the first image.

Although the entire circuit is not shown in FIG. 8, the rest of the configuration and operation are the same as those of the second embodiment.

However, either the internal clocks CKcal and CKmem as described in the second embodiment or the internal clock signal INTCK can be used as the clock signal for the processing circuit 254 of processing unit 25B and the memory circuit 265 of memory unit 26B.

According to the third embodiment, the same effects as those of said first or second embodiment can be realized.

In addition, the third embodiment is effective, for example, when the first input image ISIM1 is image data sent from a broadcasting station, the second input image ISIM2 is reproduced data from a video recorded image, and the two images are displayed on the same display unit.

Fourth Embodiment

Figure 9:
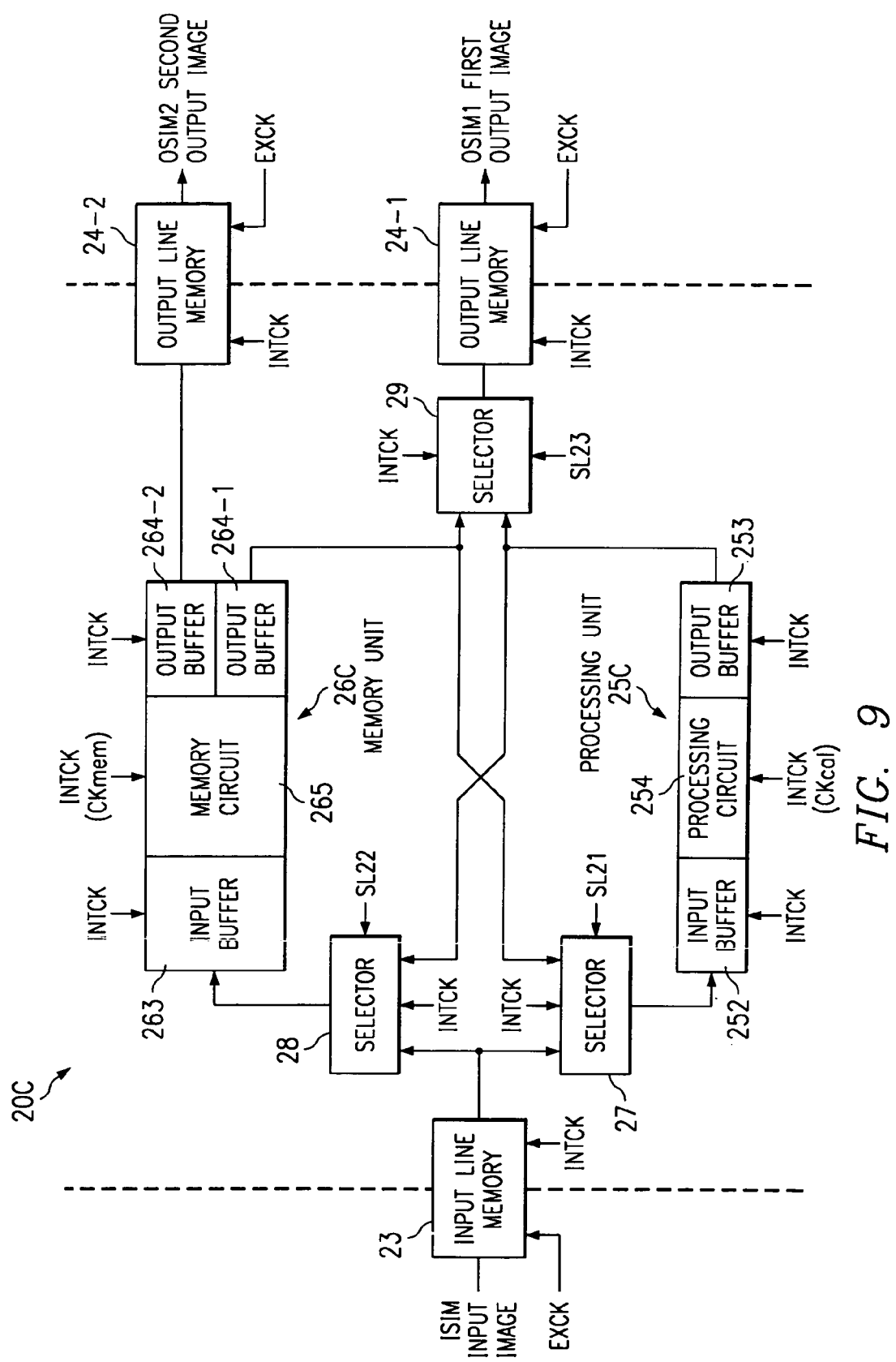
FIG. 9 is a block diagram illustrating the fourth embodiment of the image processing device disclosed in the present invention.

FIG. 9 is a block diagram illustrating the fourth embodiment of the image processing device disclosed in the present invention.

The difference between the fourth and second embodiments is as follows: the memory unit has multiple output buffers (2 in the fourth embodiment); as a result, a second output line memory is adopted; the intermediate processing data exchanged between processing unit 25C and memory unit 26C, or the data input from input line memory 23 to processing unit 25C or memory unit 26C and the second image data, which is asynchronous with the scan line of the data input from processing unit 25C, or memory unit 26C to the first output line memory 24-1, are output as the second output image OSIM2 via the second output line memory 264-2.

Although the entire circuit is not shown in FIG. 9, the rest of the configuration and operation are the same as those of the second embodiment.

However, either the internal clocks CKcal and CKmem as described in the second embodiment or the internal clock signal INTCK can be used as the clock signal for the processing circuit 254 of processing unit 25C and the memory circuit 265 of memory unit 26C.

According to the fourth embodiment, the same effect as those of said first or second embodiment can be realized.

In addition, the fourth embodiment is also effective in the case when the first image data are data for high-quality HDTV because it is necessary to convert the data to a standard format (SD format) for, e.g., the NTSC system when recording the image with a video device.

In this case, the so-called down conversion from the HDTV format to the SD format is performed in a part of processing unit 25C, and the converted data are output from the second output buffer 264-2 of memory unit 26C.

Fifth Embodiment

Figure 10:
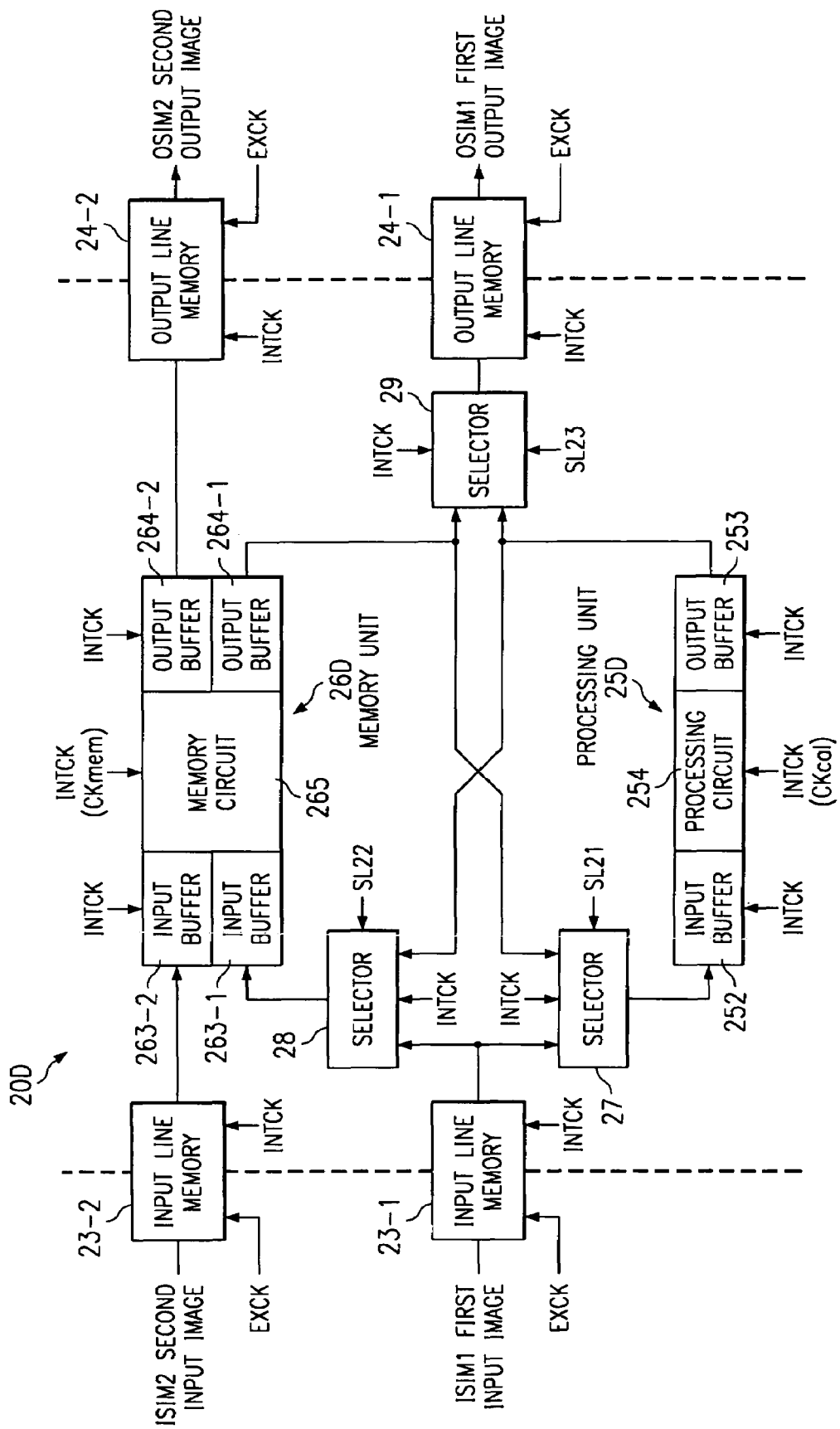
FIG. 10 is a block diagram illustrating the fifth embodiment of the image processing device disclosed in the present invention.

FIG. 10 is a block diagram illustrating the fifth embodiment of the image processing device disclosed in the present invention.

The fifth embodiment includes the configurations disclosed in said third and fourth embodiments.

That is, the second input line memory 23-2 and the second output line memory 24-2 are adopted. Also, the second input buffer 263-2 and the second output buffer 264-2 are arranged in memory unit 26D.

This embodiment is effective in the case when the scan line input from the input line memory to memory unit 26D, the scan line of the intermediate processing data exchanged between processing unit 25D and memory unit 26D, and the scan line of the data output from processing unit 25D or memory unit 26D to the output line memory are asynchronous.

According to the fifth embodiment, the same effects as those of said third and fourth embodiments can be realized.

Sixth Embodiment

FIG. 11 is a block diagram illustrating the sixth embodiment of the image processing device disclosed in the present invention. FIG. 12 is the timing diagram of the image processing device shown in FIG. 11.

The circuit configuration of the sixth embodiment is basically identical to that of the first embodiment shown in FIG. 3. However, as shown in FIG. 12(e), the number of pixels in one scan line of the output image data of processing unit 25E and memory unit 26E is smaller than that of output image data S23 of input line memory 23 shown in FIG. 12(C). This is different from the first embodiment.

In this case, a reduction process, such as compression, is performed on the pixels in processing unit 25E.

Although the entire circuit is not shown in FIG. 11, the rest of the configuration and operation are the same as those of the first embodiment.

The sixth embodiment shows an example of compression by reducing the number of pixels of the output image compared with the input image. However, it is also applicable in the case of expansion by increasing the number of pixels.

According to the sixth embodiment, the same effects as those of the first embodiment can be realized.

Seventh Embodiment

FIG. 13 is a block diagram illustrating the seventh embodiment of the image processing device disclosed in the present invention. FIG. 14 is the timing diagram of the image processing device shown in FIG. 13.

The circuit configuration of the seventh embodiment is basically identical to that of the first embodiment shown in FIG. 3. However, as shown in FIG. 14(e), the number of scan lines of the output image data of processing unit 25F and memory unit 26F is larger than the output image data S23 of input line memory 23 shown in FIG. 14(c). This is different from the case of the first embodiment.

In this case, an interpolation treatment is performed for the scan lines of the input image in processing unit 25F.

For example, although the image signals processed by television, video equipment, etc. are interlaced signals, the interlaced signals will cause flickering if the image contains thin horizontal lines.

On the other hand, the progressive signals used in computers do not have this problem.

Consequently, conversion from interlaced signals to progressive signals has been performed even for television receivers in recent years to realize display in a progressive way. Therefore, this embodiment is effective in the case when it is necessary to convert interlaced signals to progressive signals (IP conversion).

Processing unit 25E performs motion detection by comparing the data of the current frame with the data of the previous one or two frames on a line where there are no data of interlaced signal and then forms interpolation data. The interlaced signals are converted into progressive signals based on this interpolation data.

The seventh embodiment shows an example of expansion by increasing the number of scan lines of the output image compared with the input image. However, it is also applicable to the case of compression by reducing the number of scan lines.

Although the entire circuit is not shown in FIG. 13, the rest of the configuration and operation are the same as those of the first embodiment.

According to the seventh embodiment, the same effects as those of the first embodiment can be realized.

Eighth Embodiment

FIG. 15 is a block diagram illustrating the eighth embodiment of the image processing device disclosed in the present invention. FIG. 16 is the timing diagram of the image processing device shown in FIG. 15.

The image processing device 20G disclosed in the eighth embodiment has other processing units, more specifically, statistical processing unit 30 and matrix processing unit 31 in addition to processing unit 25 and memory unit 26 which process image data in units of one scan line in the image processing device disclosed in the first embodiment. The input data from input line memory 23, the intermediate processing data exchanged between processing unit 25G and memory unit 26G, or the data output to output line memory 24 are processed the required number of times.

Said statistical processing unit 30 calculates the minimum, maximum, and average values and is able to form a brightness histogram. In the histogram, distribution of the bright parts and dark parts can be controlled. The data are used for processing performed by processing unit 25G.

Matrix processing unit 31 performs conventional matrix calculation for conversion between the R (red), G (green), B (blue) signals of the three primary colors and brightness signal Y, color difference signals CR, CB.

Other processing units include the blending unit which performs the so-called α blending and image switching unit.

These processing units have multiple sets of coefficients and can vary the set of coefficients when the same processing unit is used multiple times.

The matrix processing unit 31 disclosed in the eight embodiment can perform "3×3" matrix calculation and three third-order polynomial calculations, depending on a switch setting.

Figure 17:
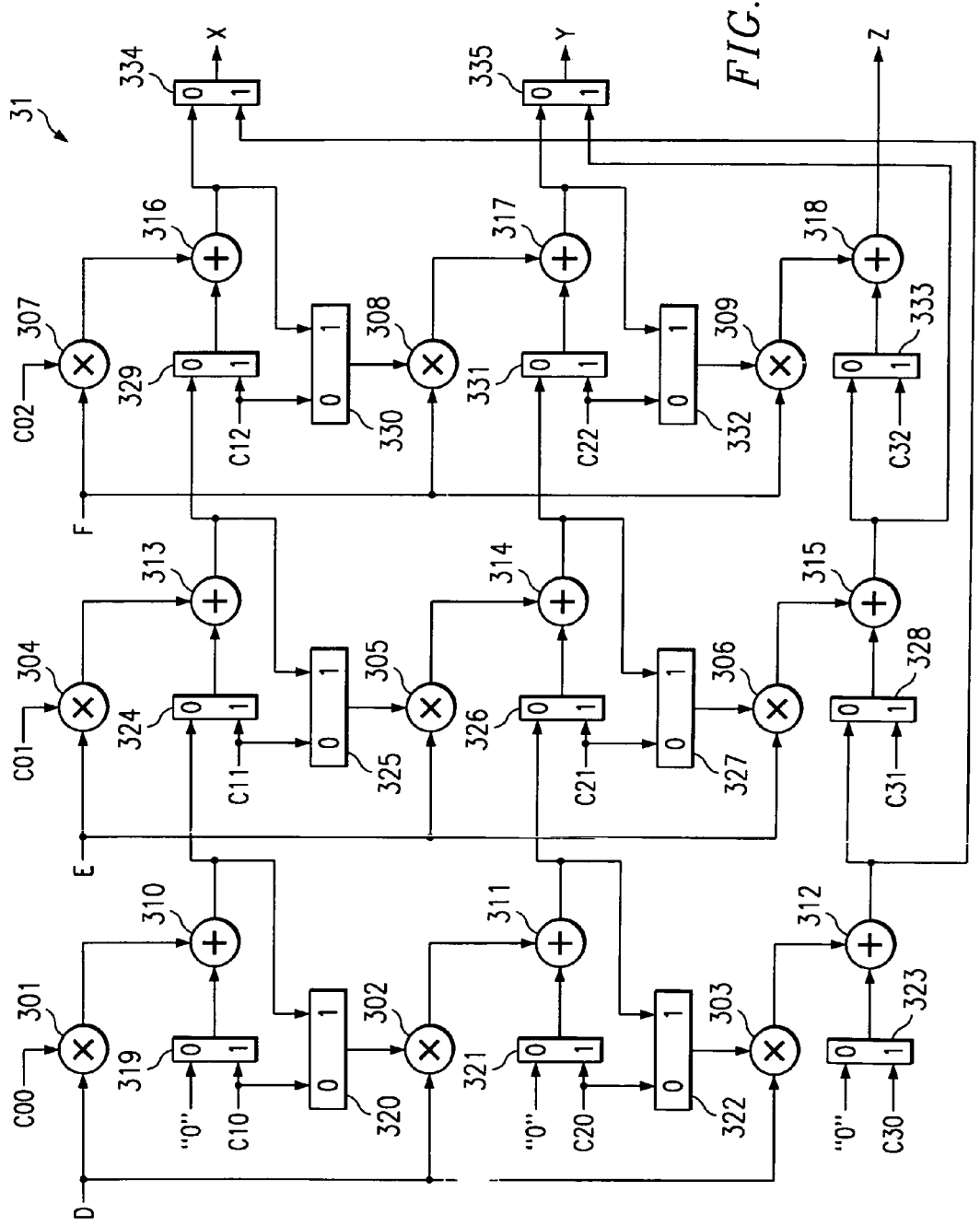
FIG. 17 is a circuit diagram illustrating the main parts of the matrix processing unit used in the present invention.

FIG. 17 is a circuit diagram illustrating the main parts of matrix processing unit 31 used in the present invention.

This circuit receives three inputs D, E, and F and obtains three outputs X, Y, and Z.

More specifically, the circuit has 9 multipliers (301)–(309), 9 adders (310)–(318), and 17 selectors (319)–(335).

Multiplier 301 multiplies input D by coefficient C00. Multiplier 302 multiplies input D by the output of selector 320. Multiplier 303 multiplies input D by the output of selector 322.

Similarly, multiplier 304 multiplies input E by coefficient C01. Multiplier 305 multiplies input E by the output of selector 325. Multiplier 306 multiplies input E by the output of selector 327.

Multiplier 307 multiplies input F by coefficient C02. Multiplier 308 multiplies input F by the output of selector 330. Multiplier 309 multiplies input F by the output of selector 332.

Adder 310 adds the output of multiplier 301 and the output of selector 319. Adder 311 adds the output of multiplier 302 and the output of selector 321. Adder 312 adds the output of multiplier 303 and the output of selector 323.

Adder 313 adds the output of multiplier 304 and the output of selector 324. Adder 314 adds the output of multiplier 305 and the output of selector 326. Adder 315 adds the output of multiplier 306 and the output of selector 328.

Adder 316 adds the output of multiplier 307 and the output of selector 329. Adder 317 adds the output of multiplier 308 and the output of selector 331. Adder 318 adds the output of multiplier 309 and the output of selector 333.

When selector 319 selects side "0," 0 is output to adder 310. When side "1" is selected, coefficient C10 is output. When selector 320 selects side "0," coefficient C10 is output to multiplier 302. When side "1" is selected, the output of adder 310 is output. When selector 321 selects side "0," 0 is output to adder 311. When side "1" is selected, coefficient C20 is output. When selector 322 selects side "0," coefficient C20 is output to multiplier 303. When side "1" is selected, the output of adder 311 is output. When selector 323 selects side "0," 0 is output to adder 312. When side "1" is selected, coefficient C30 is output.

When selector 324 selects side "0," the output of adder 310 is output to adder 313. When side "1" is selected, coefficient C11 is output. When selector 325 selects side "0," coefficient C11 is output to multiplier 305. When side "1" is selected, the output of adder 313 is output. When selector 326 selects side "0," the output of adder 311 is output to adder 314. When side "1" is selected, coefficient C21 is output. When selector 327 selects side "0," coefficient C21 is output to multiplier 306. When side "1" is selected, the output of adder 314 is output. When selector 328 selects side "0," the output of adder 312 is output to adder 315. When side "1" is selected, coefficient C31 is output.

When selector 329 selects side "0," the output of adder 313 is output to adder 316. When side "1" is selected, coefficient C12 is output. When selector 330 selects side "0," coefficient C12 is output to multiplier 308. When side "1" is selected, the output of adder 316 is output. When selector 331 selects side "0," the output of adder 314 is output to adder 317. When side "1" is selected, coefficient C22 is output. When selector 332 selects side "0," coefficient C22 is output to multiplier 309. When side "1" is selected, the output of adder 317 is output. When selector 333 selects side "0," the output of adder 315 is output to adder 318. When side "1" is selected, coefficient C32 is output.

When selector 334 selects side "0," the output of adder 316 is output as X. When side "1" is selected, the output of adder 312 is output as X.

When selector 335 selects side "0," the output of adder 317 is output as Y. When side "1" is selected, the output of adder 315 is output as Y.

The output of adder 318 is taken as output Z.

For matrix operating part 31 with the aforementioned configuration, when selectors 319–335 select side "0," the following outputs X, Y, and Z are obtained.

[Mathematical Equation 1]

$$X = C00*D + C01*E + C02*F$$

$$Y = C10*D + C11*E + C12*F$$

$$Z = C20*D + C21*E + C22*F$$

When selectors 319–335 select side "1," the following outputs X, Y, and Z are obtained.

[Mathematic Equation 2]

$$X = ((C00*D + C10)*D + C20)*D + C30$$
$$= C00*D^3 + C10*D^2 + C20*D + C30$$
$$Y = ((C01*E + C11)*E + C21)*E + C31$$
$$= C01*E^3 + C11*E^2 + C21*E + C31$$
$$Z = ((C02*F + C12)*F + C22)*F + C32$$
$$= C02*F^3 + C12*F^2 + C22*F + C32$$

Such calculation is effective for so-called γ conversion processing.

According to the eighth embodiment, the same effects as those of the first embodiment can be realized. Since each processing block has multiple sets of coefficients and the set of coefficients can be changed for each process, various types of processes can be realized.

Ninth Embodiment

Figure 18:
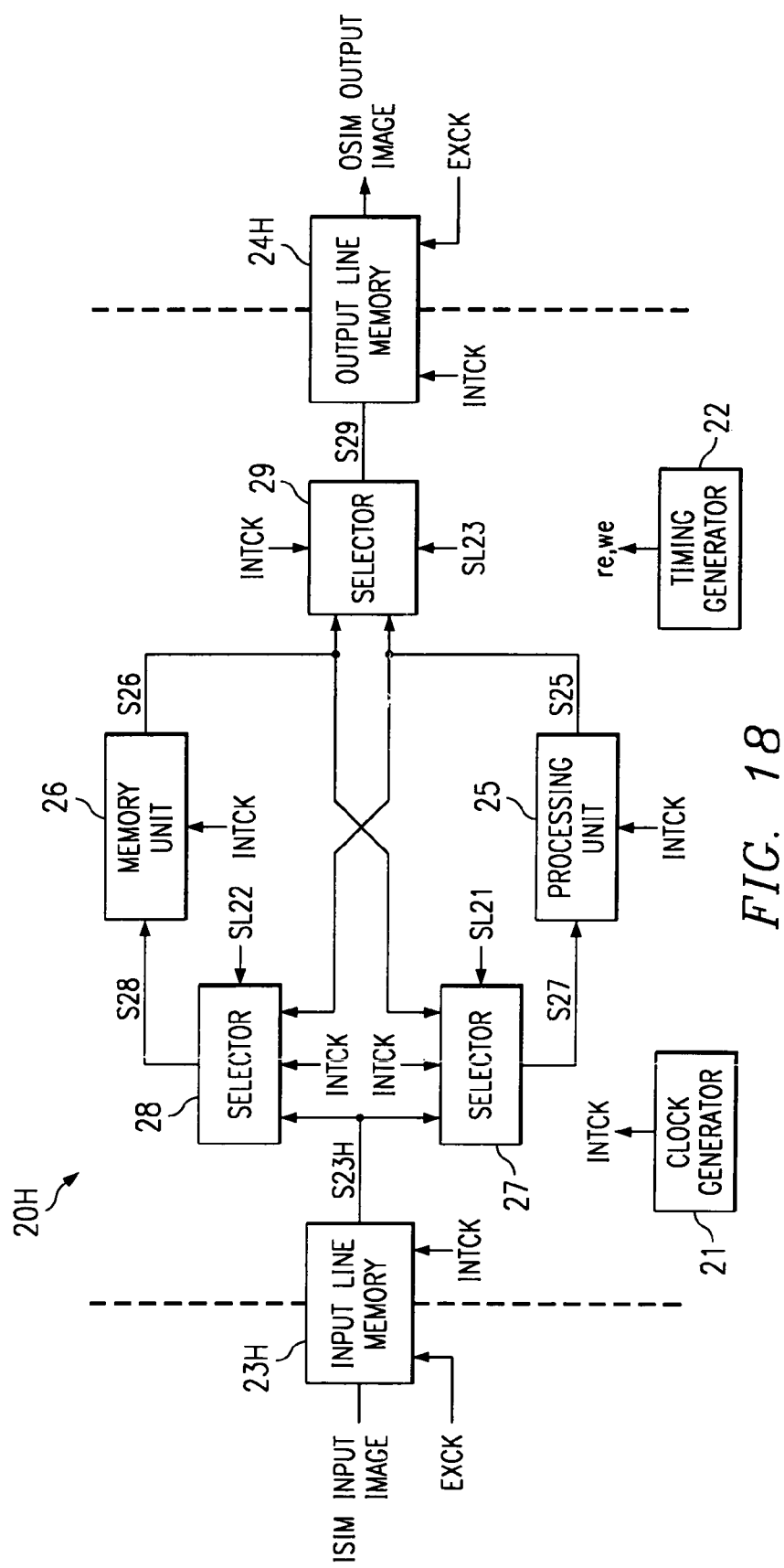
FIG. 18 is a block diagram illustrating the ninth embodiment of the image processing device disclosed in the present invention.

FIG. 18 is a block diagram illustrating the ninth embodiment of the image processing device disclosed in the present invention.

The circuit configuration of the ninth embodiment is basically identical to that of the first embodiment shown in FIG. 3. However, when the image data of a scan line having more P pixels (such as 1930 pixels) than the capacity (such as 1280 pixels) of the input line memory are input, the data writing and reading method for the input line memory and output line memory are different.

Figure 19:
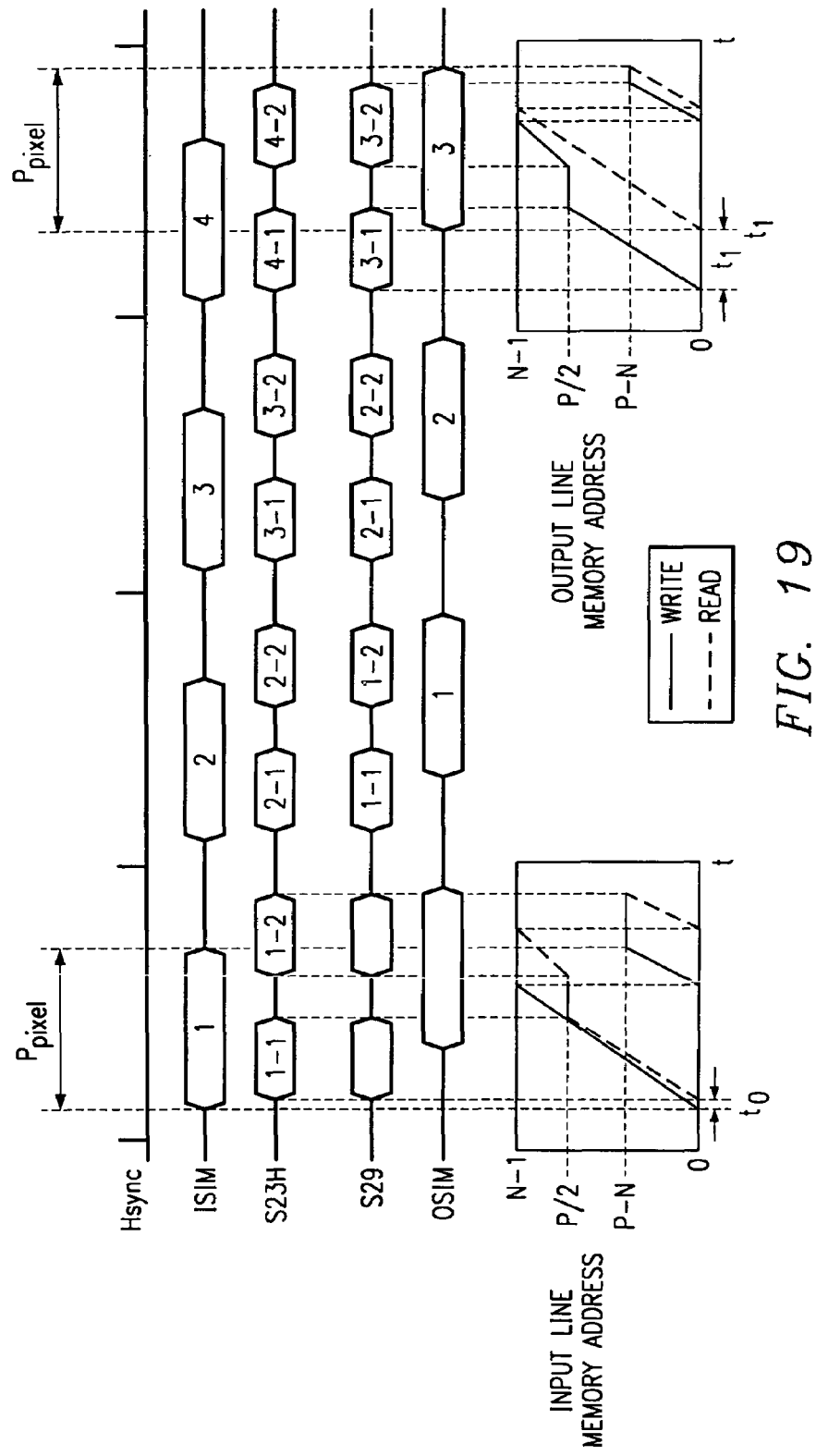
FIG. 19 is a diagram explaining the data writing/reading method disclosed in the ninth embodiment for the input line memory and output line memory in the case when inputting image data with more pixels than the capacity of the input line memory.

FIG. 19 is a diagram explaining the data writing and reading method of the input line memory and output line memory in the case when image data with more P pixels than the capacity of the input line memory are input.

When the image data of a scan line that has more pixels than the capacity of the input line memory are input, as shown in FIG. 19(f), the image data of the scan line are written continuously into input line memory 23H. After a prescribed period of time (t0) from the beginning of the writing operation has passed, some of the image data of the scan line are read. After the reading operation is stopped for a prescribed period of time, the rest of the scan line is read. The above operation is repeated.

That is, the scan line with more pixels than the capacity of input line memory 23H is divided into multiple data blocks with a prescribed number of pixels, and the data blocks are sent to processing unit 25H or memory unit 26H.

After the image data divided into multiple blocks are processed in processing unit 25H, memory unit 26H, or another processing unit, as shown in FIG. 19(g), the processing results are written to output line memory 24H. After a prescribed period of time (t1) since the beginning of the writing operation, the multiple blocks are continuously read.

In this way, the data can be output as the original one scan line.

According to the ninth embodiment, the same effects as those of the first embodiment can be realized. When the number of pixels on one scan line exceeds the number of pixels that can be processed, the pixels for one scan line can be divided into multiple data packets of processible size and processed. Also, the processed data packets can be connected and output.

In the ninth embodiment, one scan line is divided into two data packets. However, if the scan line is divided into three or more data packets, the number of pixels on one scan line allows processing of three times or more images compared with the number of pixels that can be processed by the processor.

Tenth Embodiment

Figure 20:
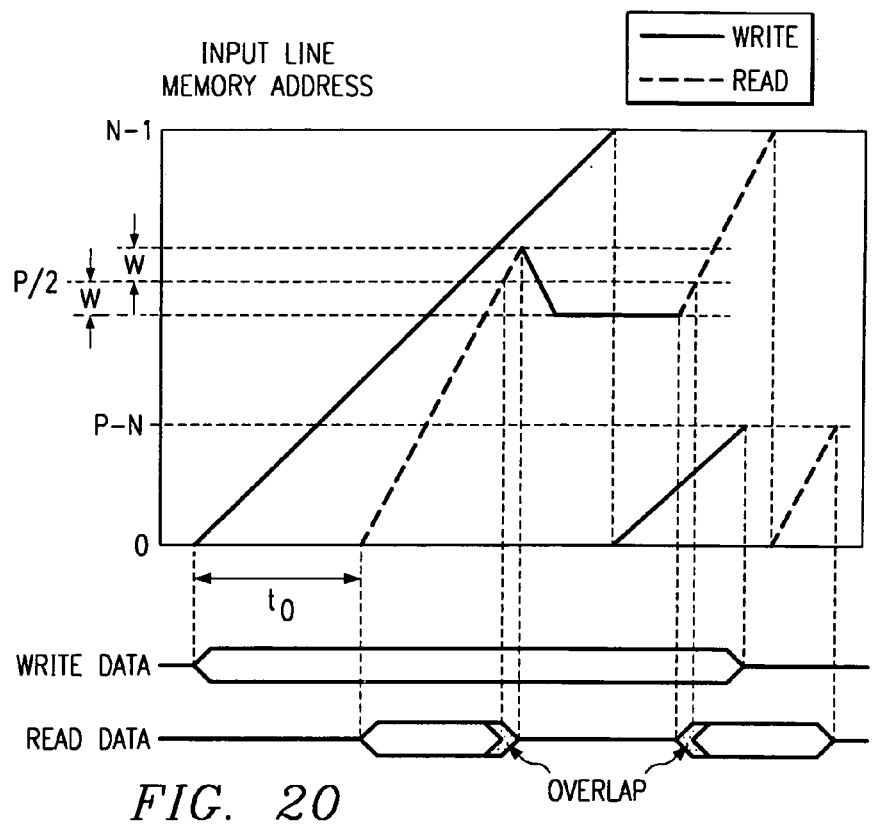
FIG. 20 is a diagram explaining the tenth embodiment of the image processing device disclosed in the present invention.
Figure 21:
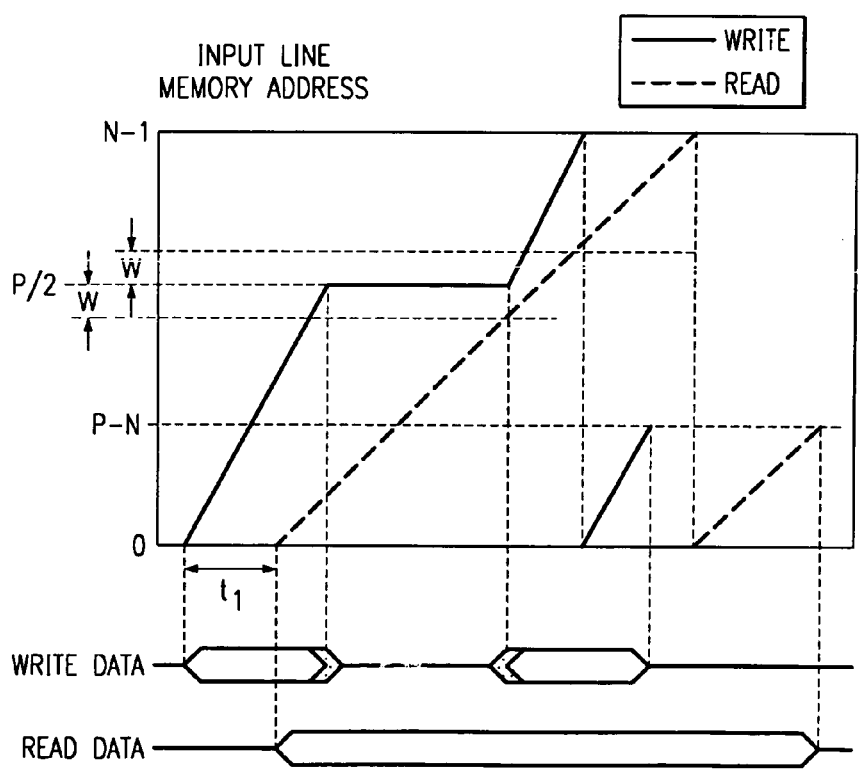
FIG. 21 is a diagram explaining the tenth embodiment of the image processing device disclosed in the present invention.

FIGS. 20 and 21 are diagrams explaining the tenth embodiment of the image processing device disclosed in the present invention.

The tenth embodiment is an improvement on the image data writing and reading method for the input/output line memory described in said ninth embodiment.

In the ninth embodiment, when the image data of a scan line having more pixels than the capacity of the input line memory are input, the image data of the scan line are continuously written to input line memory 23H. After a prescribed period of time (t0) from the beginning of the write operation, part of the image data of the scan line are read. After the reading operation is stopped for a prescribed period of time, the rest of the scan line is read out. The operation is repeated. In the tenth embodiment, however, as shown in FIG. 20, the reading address is returned during the read stopping period.

The final part of a data block that has been read is overlapped with the beginning part of the data block to be read next (overlapped reading).

More specifically, as shown in FIG. 20, the original data block length is exceeded by w to read data from the input line memory, and 2w address is returned during the read stop period.

Also, in the ninth embodiment, after the image data divided into multiple blocks are processed in processing unit 25H, memory unit 26H, or other processing unit, the processing results are written to output line memory 24H. After a prescribed period of time (t1) from the beginning of the writing operation, the multiple blocks are continuously read. In the tenth embodiment, however, as shown in FIG. 21, when the processing results are written to output line memory 24H, the aforementioned overlapped part is not written. After a prescribed period of time from the beginning of the write operation, the multiple blocks are continuously read. In this way, the data can be output as the original one scan line without repetition.

In addition to the effect realized by said ninth embodiment, the tenth embodiment also has the advantage that data can be processed continuously even if one scan line is divided into multiple data packets.

Eleventh Embodiment

Figure 22:
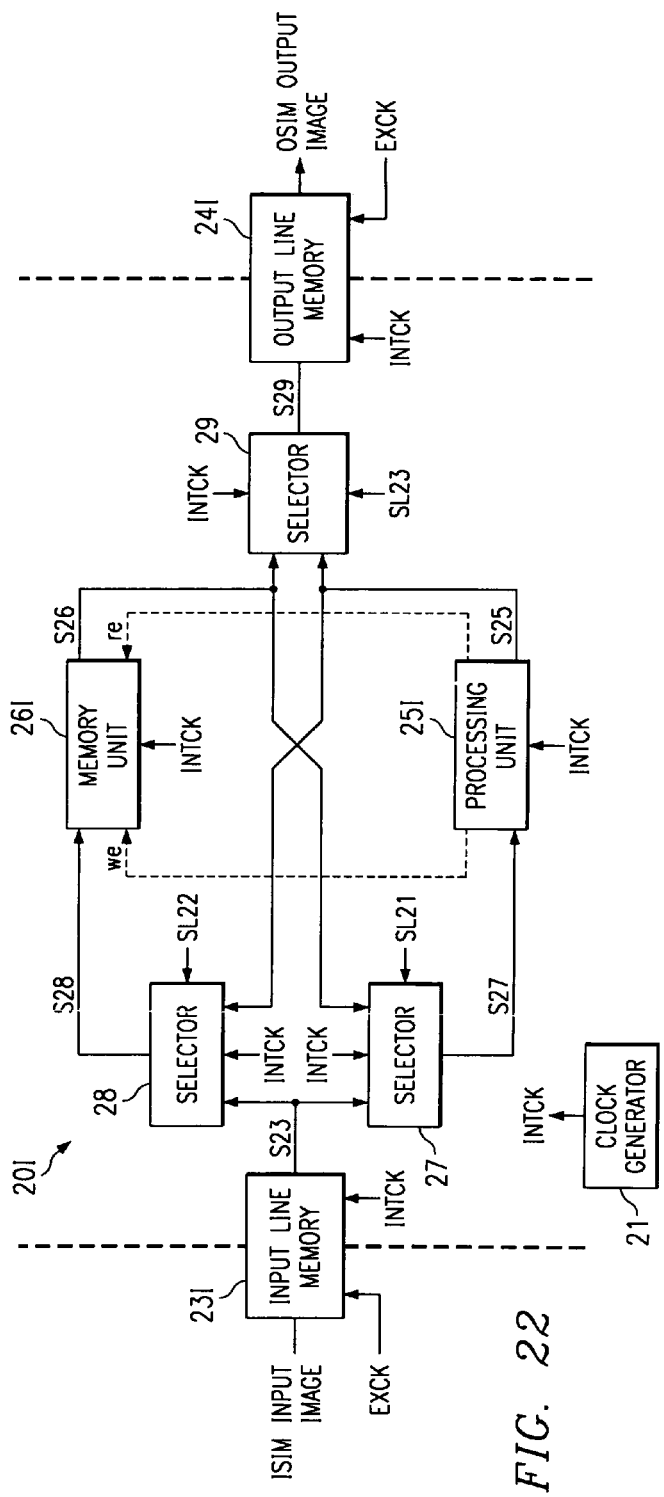
FIG. 22 is a block diagram illustrating the eleventh embodiment of the image processing device disclosed in the present invention.

FIG. 22 is a block diagram illustrating the eleventh embodiment of the image processing device disclosed in the present invention.

The difference between the eleventh and first embodiments is that instead of using a special timing generator to generate write enable signal we and read enable signal re, any timing can be generated by software according to a program in processing unit 25I and can be supplied to, for example, memory unit 26I.

Figure 23:
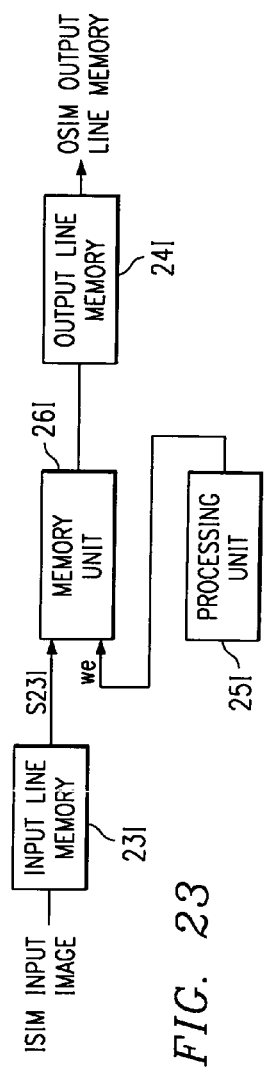
FIG. 23 is a diagram explaining the case of supplying write enable signal we set at the desired timing to the processing unit and memory unit in the eleventh embodiment.

FIGS. 23 and 24 are diagrams for explaining the case of supplying write enable signal we set at the desired timing to processing unit 25I and memory unit 26I.

As shown in FIG. 23, write enable signal we is supplied from processing unit 25I to the writing system of memory unit 26I. As shown in FIG. 24(d), however, the write enable signal we in this case is generated in such a way that the write execution/stop (active/inactive) is repeated intermittently in any period for each pixel or scan line.

The write enable signal we controlled in this way is used to control the write operation of processing unit 25I, memory unit 26I, or output line memory 24H. In this way, the size of the image can be reduced.

For example, to display a 4:3 image on a display with an aspect ratio of 16:9, the entire image will be expanded in the horizontal direction. In this case, when the region corresponding to the central part is written, the period for repeating active/inactive is shortened to reduce many pixels. In this way, expansion in the horizontal direction in the central part can be restrained.

FIGS. 25 and 26 are diagrams explaining a case of supplying read enable signal re set at the desired timing to processing unit 25I and memory unit 26I.

As shown in FIG. 25, read enable signal re is supplied from processing unit 25I to the reading system of memory unit 26I. As shown in FIG. 26(e), however, the read enable signal re in this case is generated in such a way that write execution/stop (active/inactive) is repeated intermittently in any period for each pixel or scan line.

The read enable signal re controlled in this way is used to control input line memory 23I or the reading operation of memory unit 26I. In this way, the image can be enlarged.

In addition to the effect of said first embodiment, the eleventh embodiment of the present invention also has the advantage that the size of image can be reduced or increased as desired.

As explained above, according to the present invention, since the operation can be performed at high speed even if input/output with respect to the outside is performed at low speed, the ability of the processor can be fully exploited. In this way, the processing blocks in the processor can be used multiple times, and a circuit of large physical size can be avoided.

Also, since each processing block has multiple-sets of coefficients and the set of coefficients can be varied for each process, various types of processes can be realized.

When the number of pixels on one scan line exceeds the number of pixels that can be processed, the pixels for one scan line can be divided into multiple data packets with a processible size and can be processed. Also, the processed data packets can be connected and output.

Also, when one scan line is divided into multiple data packets, by adding an overlapped part on the boundary between the data packets, the data can be continuously processed, even if one scan line is divided into multiple data packets.

In addition, multiple asynchronous images can be input/output.

Furthermore, the number of the input/output terminals of the processing unit and memory unit can be reduced.

The invention claimed is:

1. An image processing device: with a processing unit that processes image data in units of one scan line, and a memory unit that can read and write image data in units of one scan line, characterized by the fact that it comprises
at least one input line memory that can store image data for one scan line and is able to write input image data at the transfer speed of the input image data and read the written image data at a faster speed than the transfer speed of the input image data,
a transfer unit that inputs at least the image data read from the aforementioned input line memory to the aforementioned processing unit memory unit,
a selector that selects the image data output from the aforementioned processing unit or memory unit, and
at least one output line memory that can store image data for one scan line and is able to write the image data selected by the aforementioned selector at a speed faster than the transfer speed of the image data and read the image data in units of one scan line at a prescribed speed; wherein
the aforementioned processing unit and memory unit receive image data for one scan line at a faster speed than the transfer speed of the input image data, perform prescribed processing tasks, and then output the processing results at a faster speed than the transfer speed of the input image data.

2. The image processing device described in claim 1 characterized by the following facts: the aforementioned transfer part has a first selector that selects either the image data read from the aforementioned input line memory or the image data output from the aforementioned memory unit corresponding to a first selection signal and inputs the selected image data to the aforementioned processing unit, and a second selector that selects either the image data read from the aforementioned input line memory or the image data read from the aforementioned processing unit corresponding to a second selection signal and inputs the selected image data to the aforementioned memory unit;

the aforementioned first and second selection signals are supplied in such a way that the aforementioned processing unit and memory unit exchange intermediate processing data during the time domain when no input image data or output image data are transferred.

3. The image processing device described in claim 1 or 2 characterized by the following facts: the image processing device has a timing generator that can generate a read enable signal of a block for outputting data and a write enable signal of a block for inputting said data as a single signal;

the aforementioned input line memory and/or the aforementioned memory unit functions as the block that receives the aforementioned read enable signal and outputs data, while the aforementioned memory unit or processing unit functions as the block that receives the aforementioned write enable signal and inputs data; and the image processing device has a write enable delay circuit that can delay the write enable signal appropriately so that the aforementioned memory unit or processing unit acting as the data-inputting block can correct the delay between the data-outputting block and the data-inputting block.

4. The image processing device described in claim 3 characterized by the fact that when the data from multiple data-outputting blocks are input to a single data inputting block, the image processing device has a read enable delay circuit for each of the data-outputting blocks in order to arrange the delay between each of the data-outputting blocks and the data-inputting blocks.

5. The image processing device described in claim 1, 2, 3, or 4 characterized by the fact that the transfer speed between the aforementioned input line memory and the aforementioned processing unit and memory unit, the transfer speed between the aforementioned output line memory and the aforementioned processing unit and memory unit, the processing speed of the aforementioned processing unit, and the storage speed of the aforementioned memory unit are all different.

6. The image processing device described in any of claims 1–5 characterized by the following facts: the image processing device has multiple input line memories, and the input image data to each input line memory is asynchronous;

the aforementioned memory unit has multiple input buffers corresponding to the input line memories;

the aforementioned memory unit outputs other image data after synchronizing these image data input to the corresponding input buffers from other input line memories with the scan line of the image data to one of the input line memories.

7. The image processing device described in one of claims 1–6 characterized by the following facts: the image processing device has multiple output line memories, and the output image data from each output line memory is asynchronous;

the aforementioned memory unit has multiple output buffers corresponding to the output line memories; and the aforementioned memory unit outputs the image data synchronized with the scan line of the input image data from one of the output buffers to the corresponding output line memory and outputs the image data asynchronously with the scan lines of the input image data from other output line memories to the corresponding output line memories.

8. The image processing device described in claim 6 or 7 characterized by the fact that the scan lines input from the aforementioned input line memories to the aforementioned memory unit, the scan line of the intermediate processing data exchanged between the aforementioned processing unit and memory unit, and the scan lines of the data output from the aforementioned processing unit or memory unit to the aforementioned output line memories are not synchronized with each other.

9. The image processing device described in any of claims 1–8 characterized by the fact that the aforementioned processing unit reduces the numbers of pixels of the input image data.

10. The image processing device described in any of claims 1–9 characterized by the fact that the aforementioned processing unit performs interpolation processing on the pixels of the input image data.

11. The image processing device described in any of claims 1–10 characterized by the fact that the image processing device has at least one processing part that processes image data in units of one scan line in addition to the aforementioned processing unit and memory unit, and that the input data from the aforementioned input line memory, the intermediate processing data exchanged between the aforementioned processing unit and memory unit, or the output data output to the aforementioned output line memory are processed the required number of times.

12. The image processing device described in claim 11 characterized by the fact that the aforementioned processing part has multiple sets of coefficients, and the set of coefficients used is varied when the processing part is used multiple times.

13. The image processing device described in claim 11 or 12 characterized by the fact that the aforementioned processing part includes a matrix processing unit, and the aforementioned matrix processing unit performs "3×3" matrix calculations and three third-order polynomial calculations, depending on a switch setting.

14. The image processing device described in any of claims 1–13 characterized by an input means with the following functions: when image data pertaining to a scan line that has a number of pixels that exceeds the capacity of the aforementioned input line memory are input, the scan line of the number of pixels that exceeds the capacity of the aforementioned input line memory is divided into multiple data blocks with the number of pixels below a prescribed level; the image data pertaining to the scan line are continuously written to the aforementioned input line memory; after a certain period of time has passed since the beginning of the write operation, part of the scan line is read out; after the read operation is stopped for a prescribed period of time, the rest of the scan line is read out; and the above operation is repeated.

15. The image processing device described in claim 14 characterized by an output means with the following function: after the data divided into the aforementioned multiple blocks are processed, the processing results are written to the aforementioned output line memory; after a certain period of time has passed after the beginning of the write operation, the aforementioned multiple blocks are continuously read; in this way, the original one scan line can be output.

16. The image processing device described in claim 14 or 15 characterized by the fact that the aforementioned input means returns to the read address during the aforementioned read stopping period to repeat the final part of the data block that has been read with the beginning part of the data block to be read next.

17. The image processing device described in claim 16 characterized by the fact that when the aforementioned output means writes the aforementioned processing results into the aforementioned output line memory after the data divided into multiple blocks have been processed, the aforementioned repeated part is not written, and the aforementioned multiple blocks are continuously read after a certain period of time since the beginning of the write operation has passed so that the original one scan line can be output without repetition.

18. The image processing device described in any of claims 1–17 characterized by the fact that the aforementioned processing unit shrinks images by outputting a write enable signal, that sets write execution/stop in any period for each pixel or scan line, and by controlling the write operation of the aforementioned processing unit, memory unit, or output line memory as a function of the write enable signal.

19. The image processing device described in any of claims 1–18 characterized by the fact that the aforementioned processing unit enlarges images by outputting a read enable signal that sets read execution/stop in any period for each pixel or scan line, and by controlling the reading operation of the aforementioned input line memory or memory unit as a function of the read enable signal.

* * * * *